United States Patent
Luking

(10) Patent No.: US 9,943,736 B1
(45) Date of Patent: Apr. 17, 2018

(54) GOLF CLUB HOLDER

(71) Applicant: David W. Luking, Louisville, KY (US)

(72) Inventor: David W. Luking, Louisville, KY (US)

(*) Notice: Subject to any disclaimer, the term of this patent is extended or adjusted under 35 U.S.C. 154(b) by 0 days.

(21) Appl. No.: 15/404,251

(22) Filed: Jan. 12, 2017

(51) Int. Cl.
*F16M 13/00* (2006.01)
*A63B 55/50* (2015.01)
*F16M 11/04* (2006.01)

(52) U.S. Cl.
CPC .......... *A63B 55/50* (2015.10); *F16M 11/041* (2013.01)

(58) Field of Classification Search
CPC ......... A63B 55/50; A63B 55/10; A63B 55/40; A63B 55/00; A63B 55/408; F16M 11/041; A47B 91/005; A47F 7/0021
USPC ......... 473/282; 211/70.2; 248/530, 532–533; 273/317.2, 108.2, 108.21, 108.22; 206/315.2
See application file for complete search history.

(56) References Cited

U.S. PATENT DOCUMENTS

| | | | |
|---|---|---|---|
| 4,832,338 A * | 5/1989 | Magazzi | A63B 55/10 248/530 |
| 5,437,449 A | 8/1995 | Zink | |
| 5,730,404 A | 3/1998 | Evans | |
| 5,782,443 A * | 7/1998 | La Fontaine | A63B 55/10 248/156 |
| 7,841,951 B1 | 11/2010 | Schiltz | |
| 2008/0066837 A1* | 3/2008 | Kvinge | A63B 60/62 150/160 |

* cited by examiner

*Primary Examiner* — Christopher Garft
(74) *Attorney, Agent, or Firm* — Bingham Greenebaum Doll LLP; Brian W. Chellgren; James C. Eaves, Jr.

(57) ABSTRACT

This disclosure relates to a golf club holder configured to support a golf club with an offset head in a grip-up, head-down orientation. More specifically, the disclosed golf club holder includes a body having a shaft-engaging portion, a head-engaging portion, and a middle portion between the shaft-engaging portion and head-engaging portion. A ground-engaging base extends from the head-engaging portion, supporting the body in a substantially vertical orientation. The shaft-engaging portion removably secures the shaft of a golf club. The middle portion includes an opening providing clearance for a bent club shaft or hosel. The head-engaging portion removably secures the angled offset head of the golf club. Pushing the club downwards presses the club head against a lower stop, forcing the ground-engaging base into the ground. Pulling the club upwards presses the club head against an upper stop, lifting the ground-engaging based from the ground.

11 Claims, 35 Drawing Sheets

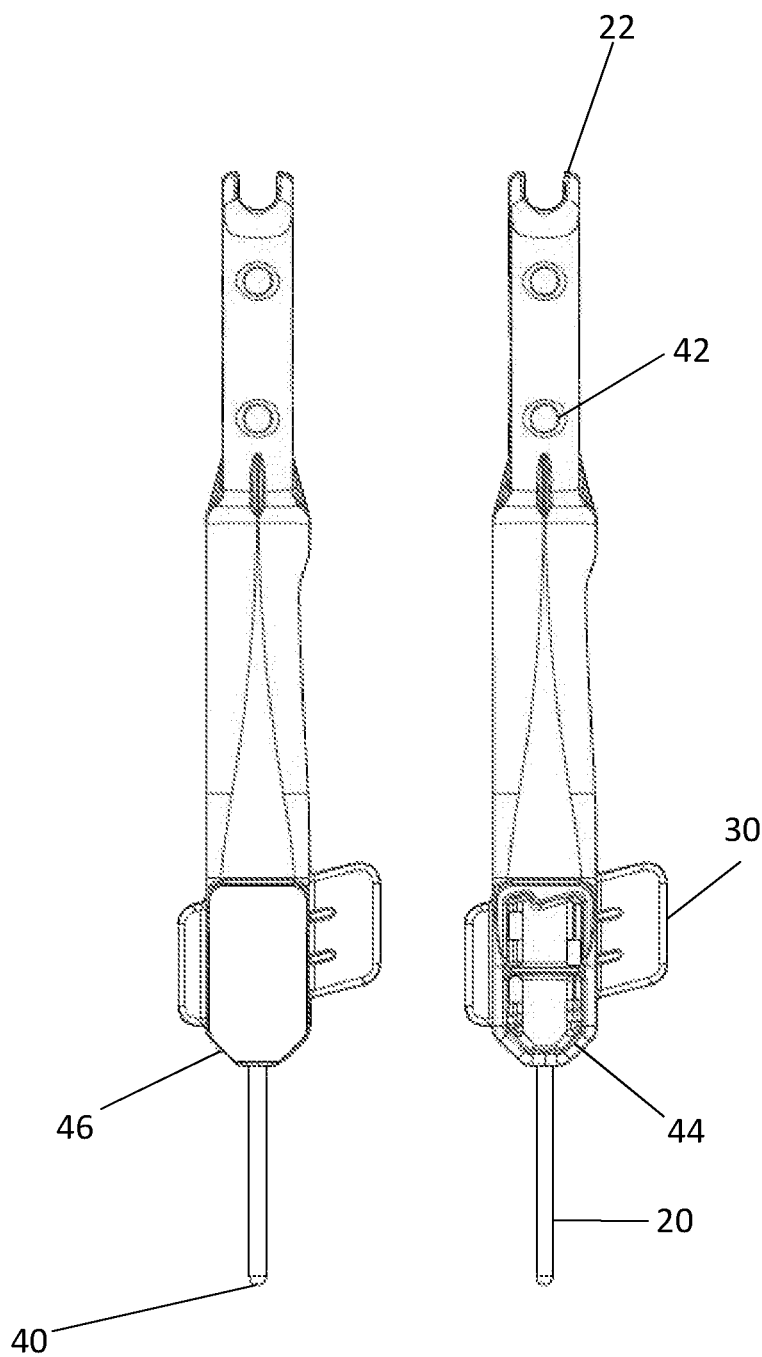

GOLF CLUB HOLDER

FIELD OF THE INVENTION

This disclosure relates to a golf club holder configured to support a golf club with an offset head in a grip-up, head-down orientation. More specifically, the disclosed golf club holder includes a body having a shaft-engaging portion, a head-engaging portion, and a middle portion between the shaft-engaging portion and head-engaging portion. A ground-engaging base extends from the head-engaging portion, supporting the body in a substantially vertical orientation. The shaft-engaging portion receives and removably secures the shaft of a golf club. The middle portion includes an opening providing clearance for a bent club shaft or hosel to exit the body. The head-engaging portion receives and removably secures the angled offset head of the golf club.

BACKGROUND OF THE INVENTION

Few golfers have the skill to reliably hit a golf ball onto a golf green from a distance. A golfer's fairway shot will typically land in the vicinity of the green. The golfer will use a wedge to hit the golf ball onto the green and then a putter to putt the ball into the hole. In this situation, a golfer will often carry his or her wedge and putter to the ball, place the putter on the ground while using the wedge to strike the ball, then place the wedge on the ground while using the putter to strike the ball. There are several inherent risks with this process, including inadvertently leaving a club behind, stepping on a club, and dirtying the club, particularly the grip. Furthermore, golfers may be inconvenienced by repeatedly bending down to place or retrieve golf clubs on the ground.

Golf club holders have been developed to address some of these problems. Many golf club holders support golf clubs in a head-up, grip-down orientation. Supporting golf clubs in this orientation may not be ideal for golfers, as they may need to retrieve their clubs by bending down to reach the grip or grasping the possibly dirty club head. Furthermore, if the golf club holder is not securely fastened to the club, the golfer may need to retrieve the holder separate to retrieving the club and the holder may not remain securely attached during storage and transportation. Other golf club holders support golf clubs in a head-down, grip-up orientation, which facilitates retrieving clubs by grasping the grip. Such golf club holders may support a golf club by engaging the club head. Golf club holders designed to support golf clubs in a head-down, grip-up orientation may maintain their position by having a portion of the holders driven into the ground. With certain golf club holders, a golfer may press the head of the club down into or against the golf club holder to drive the holder into the ground. However, the golfer must either withdraw the holder from the ground by manually pulling on the holder or pulling on the club and relying upon friction between the shaft and the holder to withdraw the holder as well.

Offset putters provide unique challenges which many golf club holders are not designed to address. Unlike standard putters, the club head in an offset putter is offset from the axis of the shaft. When addressing a golf ball, the axis of the shaft is directed at the ball and the head rests behind the ball. In some offset putters, the hosel (i.e., the part of the club head into which the shaft fits) is bent to create this offset position and a straight shaft is attached to the hosel. In other offset putters, the shaft itself is bent to locate the head in an offset position. Under current United States Golf Association rules, the shaft of the club must be straight from the top of the grip to a point not more than five inches (127 mm) above the sole (i.e., the bottom of the club head), therefore, any bend in the shaft of a USGA legal club is restricted to the lowest five inches of the club. Golf club holders developed to hold traditional golf clubs may not be capable of holding offset putters which include bent shafts or bent hosels.

It was realized by the inventor that improvements in golf club holders are needed to accommodate offset putters, to provide the ability to insert and withdraw a portion of the golf club holder into the ground while only grasping the club grip, and to provide other advantages.

SUMMARY

The disclosed golf club holder addresses these challenges and provides multiple benefits to a user. The disclosed golf club holder allows the user to store an offset putter in a head-down, grip-up, substantially vertical orientation.

Embodiments of the present invention relate to golf club holders. In some embodiments, the present invention relates to a golf club holder adapted to support an offset putter in a head-down, grip-up orientation. In some embodiments, the present invention comprises a golf club holder for supporting a golf club in a substantially vertical orientation, the golf club having a head for impacting a golf ball, an elongated shaft connected at one end to the head, and a grip attached to the other end of the shaft, the golf club holder including a body including a shaft-engaging portion configured to mechanically engage the shaft, a head-engaging portion including a lower stop and an upper stop spaced apart to receive the head between the lower stop and the upper stop, and a middle portion between the shaft-engaging portion and the head-engaging portion.

In some embodiments, the golf club holder further comprises a ground-engaging base extending from the body. In further embodiments, the ground-engaging base is a spike extending from the head-engaging portion. In certain embodiments, the shaft-engaging portion is shaped to mechanically engage the shaft via a snap-fit engagement. In some embodiments, the middle portion includes an opening sized to receive one of the shaft and a hosel positioned between the shaft and the head. In further embodiments, the head-engaging portion includes a blade, wherein the lower stop and the upper stop extend from the head-engaging portion in a direction substantially perpendicular to the blade. In certain embodiments, the blade has a width substantially equal to a width of the body. In some embodiments, the blade has a width greater than a width of the body. In further embodiments, the width of the blade, measured from a centerline of the golf club holder, is asymmetrical. In some embodiments, the golf club holder includes at least one cavity in the blade. In further embodiments, the upper stop and lower stop are angled between about 0 degrees and about 30 degrees, between about 10 degrees and about 25 degrees, or between about 15 degrees and about 20 degrees from perpendicular to a centerline of the golf club holder.

In further embodiments, the present invention comprises a method for supporting sports equipment, the method including providing a golf club having a head for impacting a golf ball, an elongated shaft connected at one end to the head, and a grip attached to the other end of the shaft, providing a golf club holder having a shaft-engaging portion configured to mechanically engage the shaft, a head-engaging portion including a lower stop and an upper stop spaced apart to receive the head between the lower stop and the upper stop, a middle portion between the shaft-engaging portion and the head-engaging portion, and a ground-engaging base extending from the head-engaging portion, attaching the golf club to the golf club holder, and driving at least a portion of the ground-engaging base into the ground, thereby supporting the golf club in a substantially vertical, head-down grip-up orientation.

In some embodiments, driving at least a portion of the ground-engaging base into the ground includes pressing the head downward against the lower stop. In further embodiments, the method further includes withdrawing the ground-engaging base from the ground subsequent to the driving. In certain embodiments, withdrawing the ground-engaging base from the ground includes pressing the head upward against the upper stop.

In certain embodiments, the present invention comprises a golf club holder for supporting a golf club, the golf club having a head for impacting a golf ball, an elongated shaft connected at one end to the head, and a grip attached to the other end of the shaft, the golf club holder including a body including a shaft-engaging portion configured to mechanically engage the shaft, a head-engaging portion including a blade and a lower stop extending substantially perpendicular to the blade, and a middle portion between the shaft-engaging portion and the head-engaging portion, and a ground-engaging base extending from head-engaging portion.

In some embodiments, the golf club holder further includes an upper stop extending substantially perpendicular to the blade, the upper stop and the lower stop being spaced apart to receive the head between the lower stop and the upper stop. In further embodiments, the upper stop, the lower stop, and the blade are each angled between about 0 degrees and about 30 degrees, between about 10 degrees and about 25 degrees, or between about 15 degrees and about 20 degrees from perpendicular to a centerline of the golf club holder.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 4A depicts a rear elevation view of the first embodiment of the golf club holder;

FIG. 4B depicts the rear elevation view of FIG. 4A with the removable cover spaced apart from the body of the golf club holder;

DETAILED DESCRIPTION OF THE PREFERRED EMBODIMENTS

Figure 1:
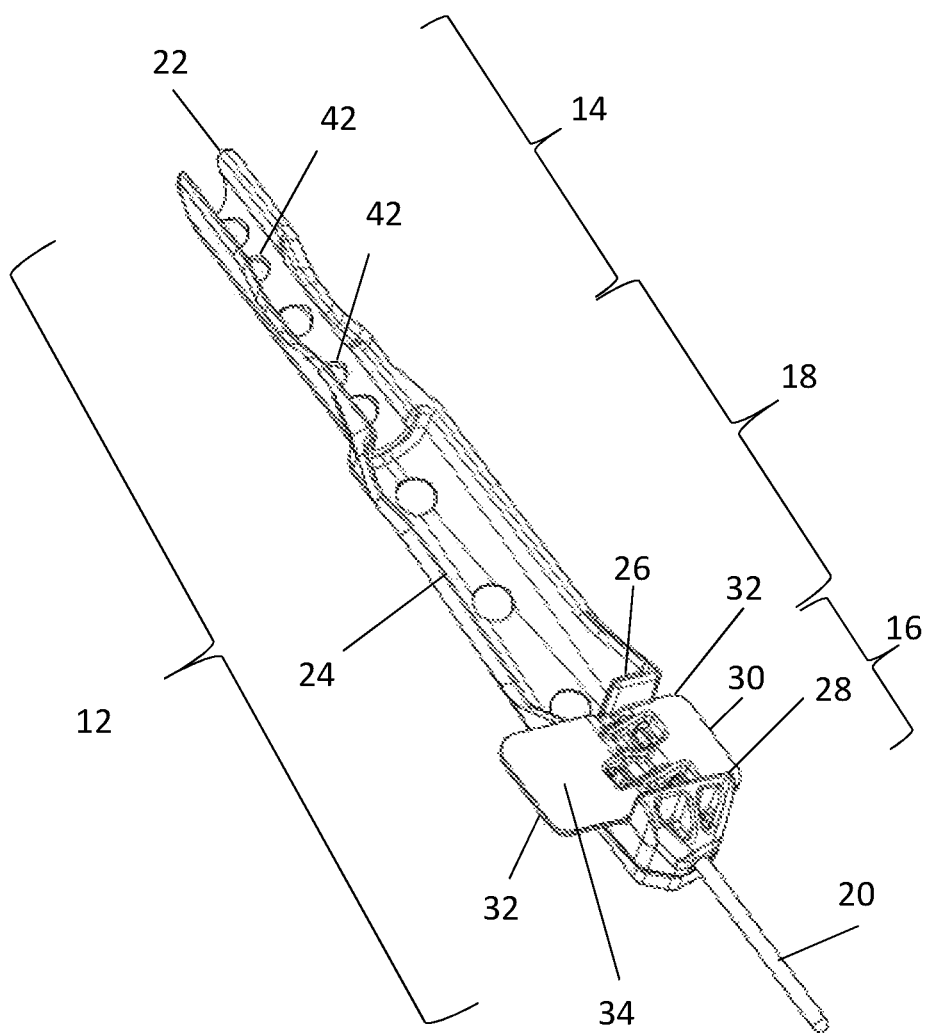
FIG. 1 depicts a front perspective view of a first embodiment of a golf club holder.
Figures 2A, 2B:
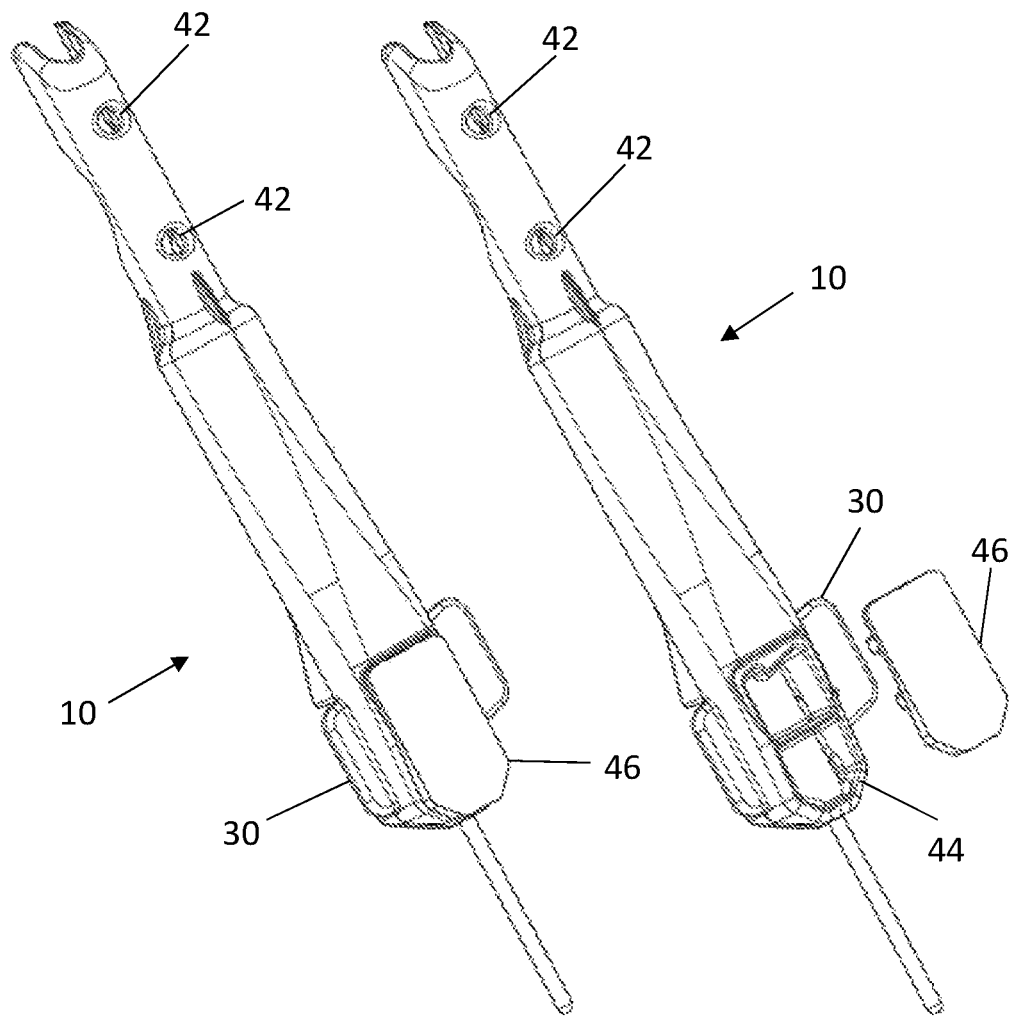
FIG. 2A depicts a rear perspective view of the first embodiment of the golf club holder.
FIG. 2B depicts the rear perspective view of FIG. 2A with the removable cover spaced apart from the body of the golf club holder.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Referring to FIGS. 1-10, a first embodiment of a golf club holder 10 is shown having a body 12 including a shaft-engaging portion 14, a head-engaging portion 16, and a middle portion 18 between the shaft-engaging portion 14 and the head-engaging portion 16. A ground-engaging base 20, such as, for example, a spike, extends downward from the head-engaging portion 16. The ground-engaging base 20 may be thrust into the ground, thereby supporting the golf club holder 10 in a substantially vertical orientation with respect to the ground. While the depicted embodiment includes a spike as the ground-engaging base 20, other embodiments (not shown) may include a plurality of spikes, a tapered downward extension of the head-engaging portion, or other ground-engaging structure preferably configured to be driven downwardly into the ground and withdrawn upwardly from the ground.

Figure 7:
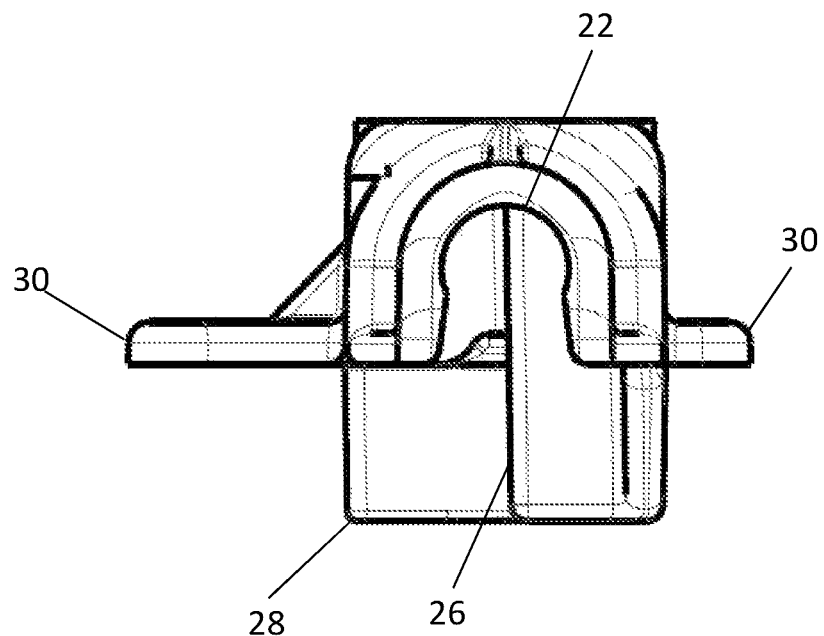
FIG. 7 depicts a top plan view of the first embodiment of the golf club holder.
Figure 8:
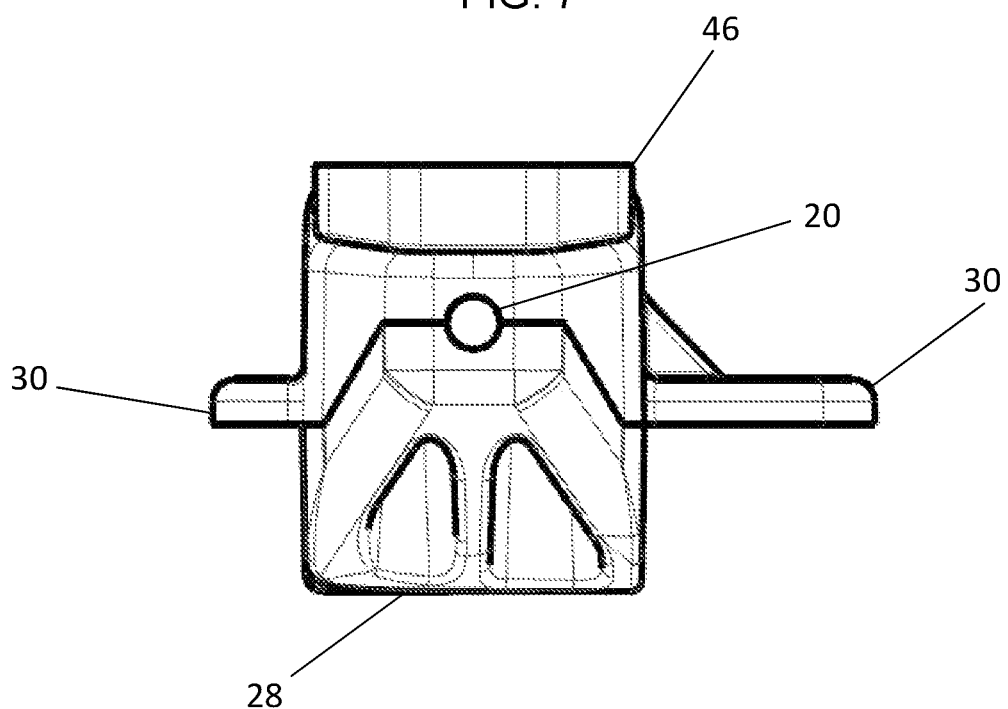
FIG. 8 depicts a bottom plan view of the first embodiment of the golf club holder.
Figure 9:
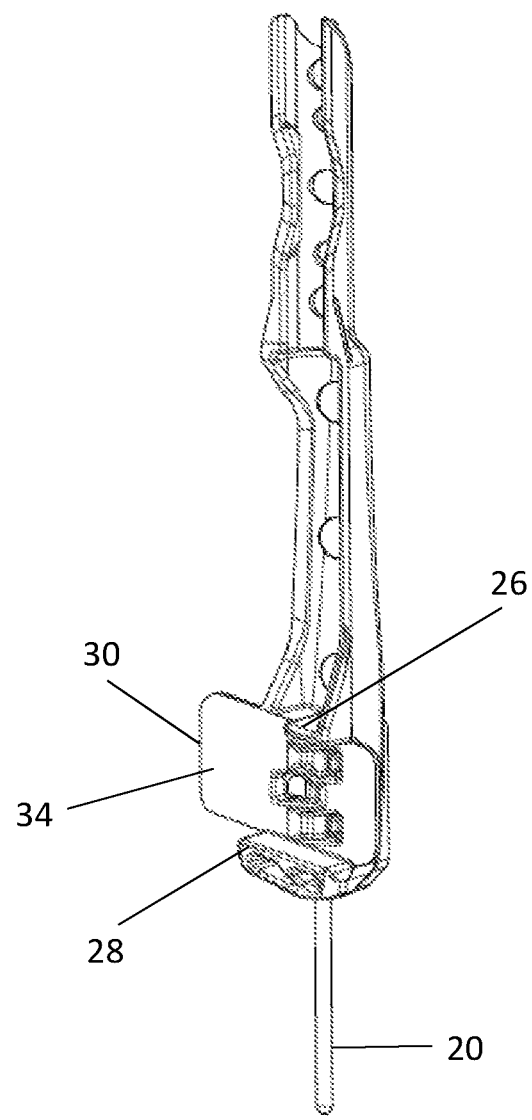
FIG. 9 depicts a front/left side perspective view of the first embodiment of the golf club holder.
Figure 10:
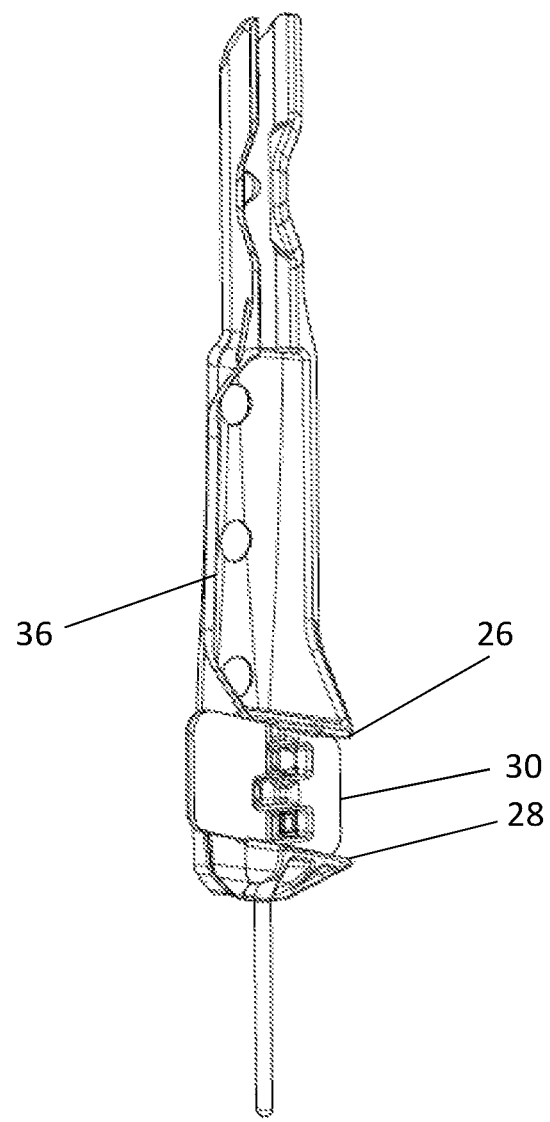
FIG. 10 depicts a front/right side perspective view of the first embodiment of the golf club holder.
Figure 11:
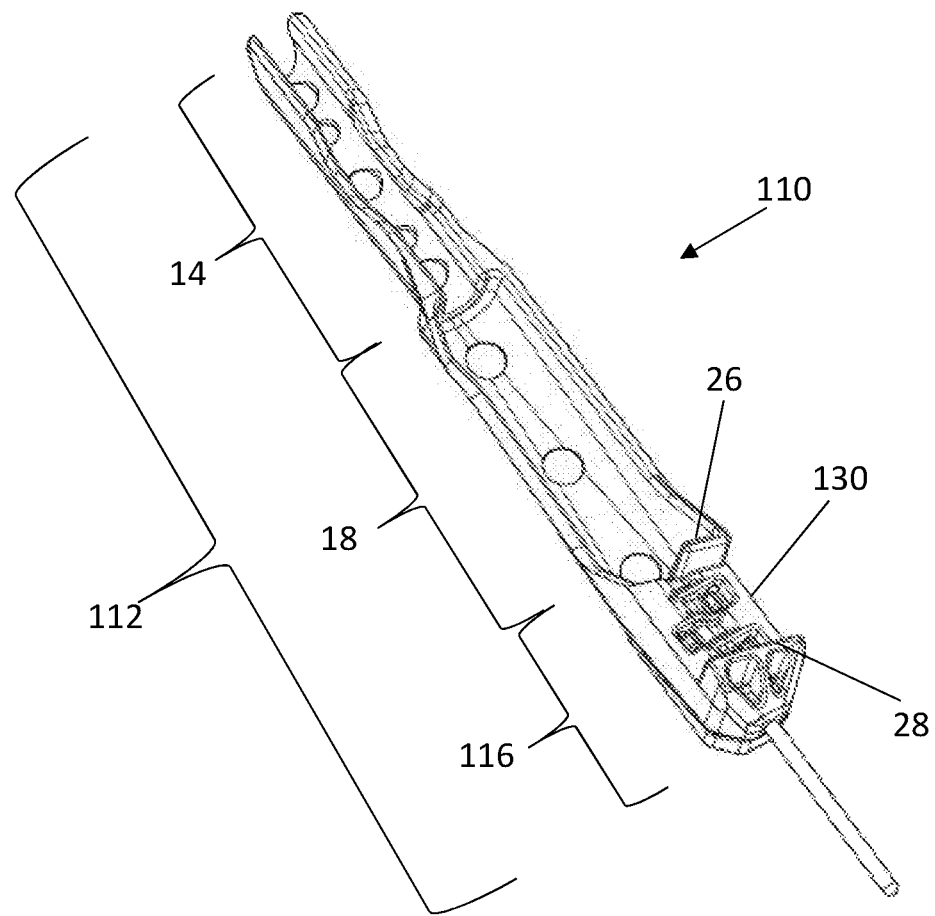
FIG. 11 depicts a front perspective view of a second embodiment of a golf club holder.
Figures 12A, 12B:
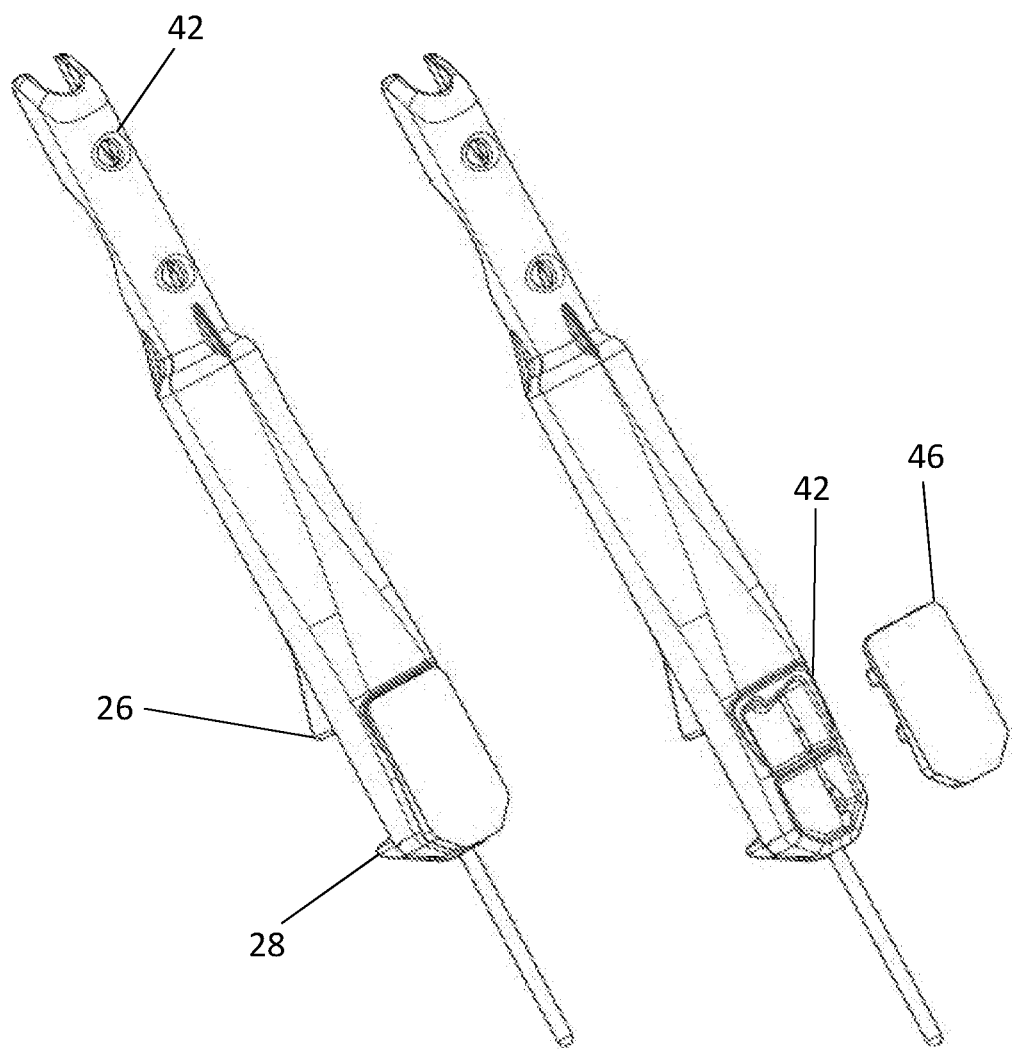
FIG. 12A depicts a rear perspective view of the second embodiment of the golf club holder.
FIG. 12B depicts the rear perspective view of FIG. 12A with the removable cover spaced apart from the body of the golf club holder.

The shaft-engaging portion 14 is configured to receive and removably secure a substantially straight portion of an elongated golf club shaft. In the depicted embodiment, the shaft-engaging portion 14 is substantially c-shaped when viewed from above, as best seen in FIG. 7, and sized to removably secure the shaft via a snap-fit attachment. In the depicted embodiment, substantially the entire length of the shaft-engaging portion 14 is configured to removably secure the shaft via a snap-fit attachment. In other embodiments, one or more subsections of the shaft-engaging portion may be configured to removably secure the shaft via a snap-fit attachment. In further embodiments, the shaft-engaging portion may include means for mechanically securing the shaft apart from or in addition to a snap-fit attachment, such as straps, closures, hook and loop fasteners, or other mechanisms know in the art.

In the depicted embodiment, as most easily seen in FIGS. 5A, 5B, 6A and 6B, the upper end 22 of the shaft-engaging portion 14 of the body 12 is angled. A golfer may carry the golf club holder 10 in a pocket or golf bag pouch, and the angled upper end 22 facilitates slipping the shaft-engaging portion 14 into the pocket or pouch. In other embodiments, the upper end may be tapered or flat.

The middle portion 18 of the golf club holder 10 is designed to accommodate a variety of golf clubs, including offset putters. Offset putters may have bent shafts or bent hosels, and the angles of the bends may differ. While the shaft-engaging portion 14 of the body 12 is designed to receive a substantially straight portion of the shaft, the middle portion 18 includes an opening 24 allowing the lower, bent portion of the shaft or a bent hosel to extend out of the body 12. In other embodiments (not shown), the middle portion may expand in width while transitioning from the shaft-engaging portion to the head-engaging portion, such that the middle portion is sufficiently wide to accommodate the bent shaft or bent hosel of the offset putter within the middle portion.

The head-engaging portion 16 includes an upper stop 26, a lower stop 28, and a substantially flat, vertically oriented blade 30. In the depicted embodiment, the width of the blade 30 is asymmetrically wider than the middle portion 18, extending further to the left (when viewed from the front) than to the right. In other embodiments (not shown), the blade may be symmetrically wider than the middle portion, extending an equal distance to the left and right. The head-engaging portion is sized to receive the head of a golf club adjacent to the blade, with the lower stop located beneath the head and the upper stop located above the head. In the depicted embodiment, the blade 30 is formed from two interlocking panels 32. In other embodiments, the blade may be formed from a single panel or may be integral to the remainder of the body. The upper stop and lower stop extend perpendicular to the head-engaging surface of the blade and are spaced apart vertically at a distance sufficient to fit a club head between the upper stop and lower stop.

Figure 3:
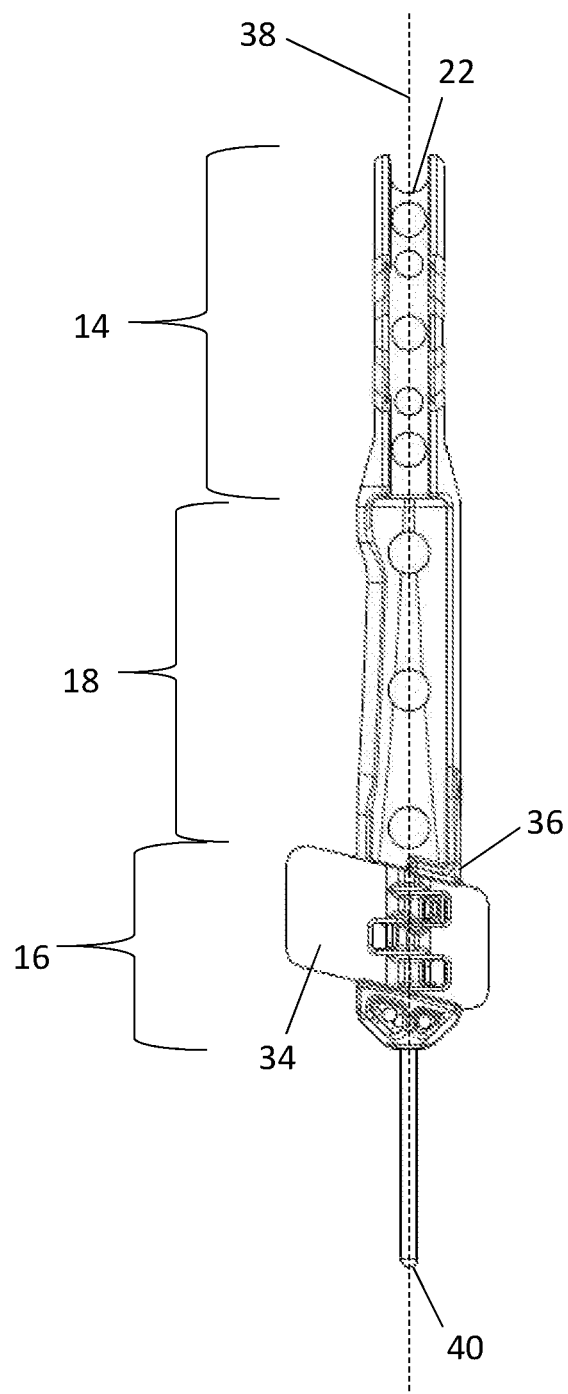
FIG. 3 depicts a front elevation view of the first embodiment of the golf club holder.
Figures 5A, 5B:
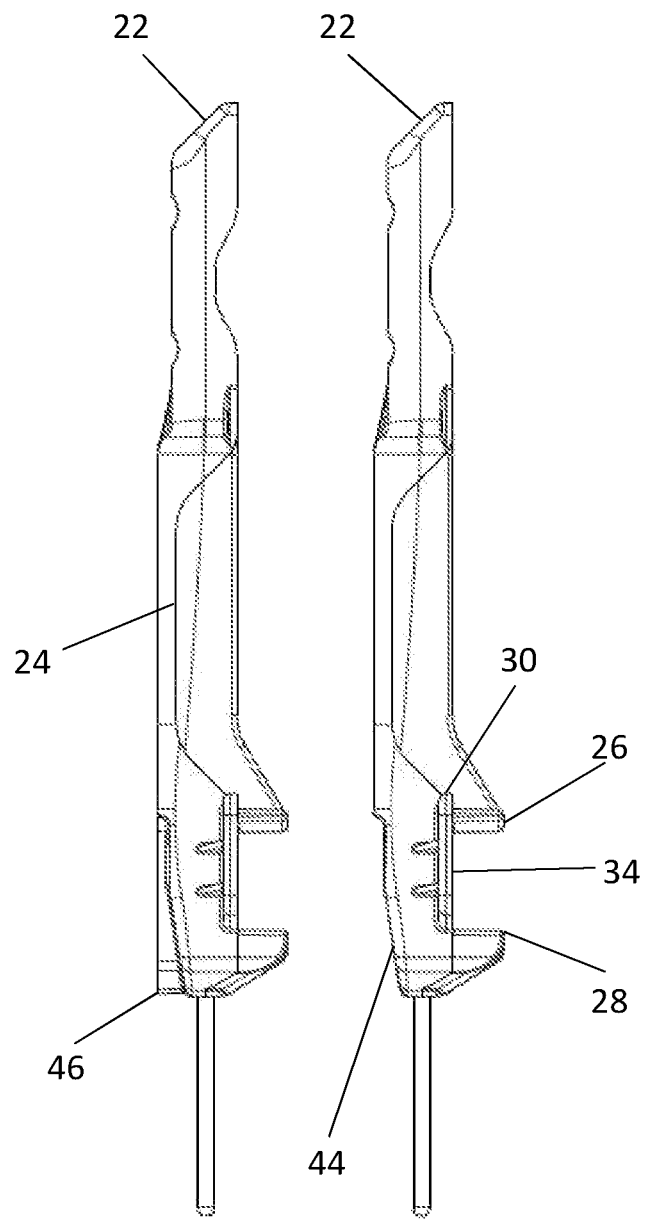
FIG. 5A depicts a right side elevation view of the first embodiment of the golf club holder.
FIG. 5B depicts the right side elevation view of FIG. 5A with the removable cover omitted.
Figures 6A, 6B:
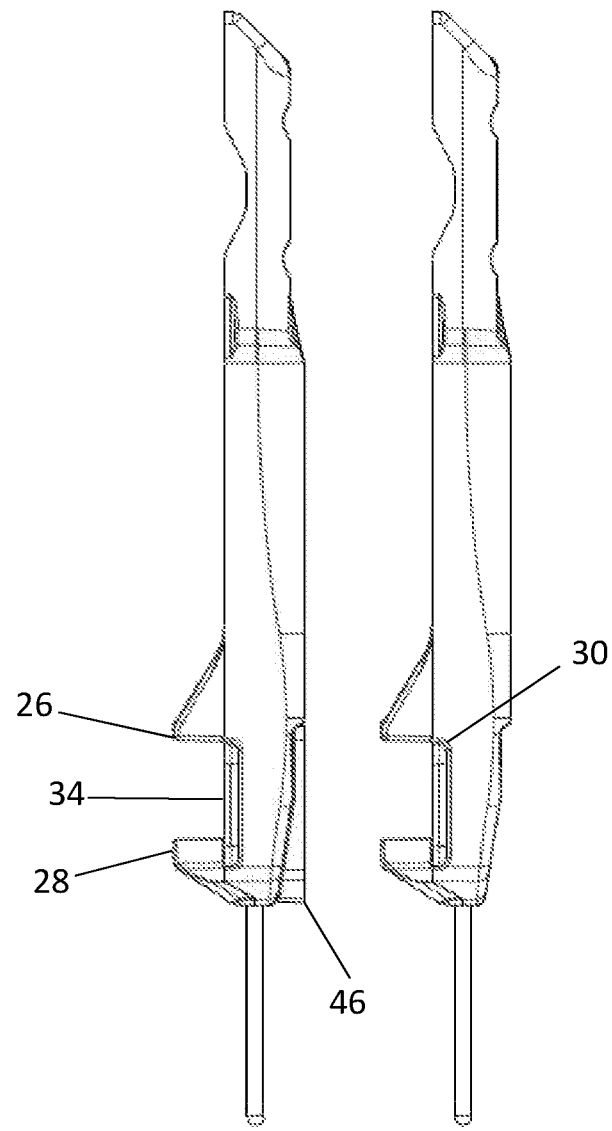
FIG. 6A depicts a left side elevation view of the first embodiment of the golf club holder.
FIG. 6B depicts the left side elevation view of FIG. 6A with the removable cover omitted.

In this embodiment, the upper stop 26 extends from the right side of the golf club holder 10 to the centerline 38 of the golf club holder 10. As shown in FIG. 3, the centerline 38 of the golf club holder 10 is an imaginary line extending through the golf club holder 10 from the upper end 22 of the shaft-engaging portion 14 to the bottom 40 of the ground-engaging base 20. This configuration is adapted for receiving offset putters. When the golf club holder 10 is mounted on an offset putter, the club shaft extends along the centerline 38 in the shaft-engaging portion 14 then deviates from the centerline 38 in the middle portion 18 as a bend in the shaft or hosel veers away from the centerline 38 and avoids the upper stop 36. The head of the offset putter is received within the head-engaging portion 16.

In some embodiments, the body 12 includes one or more cutouts 42 to provide utility, decrease the amount of material required to manufacture the golf club holder 10, and/or decrease the weight of the golf club holder 10. The depicted first embodiment includes two cutouts 42 in the shaft-engaging portion 14. A golfer may use the cutouts 42 to hang the golf club holder 10 on a hook or carabiner for storage or ease of transport, or to pass a string or thread to tie the holder 10 to a golf bag or other object. This embodiment further includes a cutout 44 in the rear of the head-engaging portion 16. In this embodiment, a removable cover 46 is provided to fill the cutout 44 in the head-engaging portion 16. FIGS. 1, 2A, 3, 4A, 5A, 6A and 7-10 depict the golf club holder 10 with the removable cover 46 attached. FIGS. 2B, 4B, 5B, 6B depict the golf club holder 10 with the removable cover 46 spaced apart or removed. The cover 46 may include indicia, such as the brand name of the golf club holder 10, the user's name or other personalizing information, an advertising display, or other written or graphical content. By changing covers 46 on a golf club holder 10, a user may easily modify and customize the appearance of the golf club holder 10. In other embodiments, the golf club holder may include a cutout and accompanying removable cover in a different location or may include multiple cutouts and removable covers. In further embodiments, the golf club holder may omit a cutout in the head-engaging portion and could instead display a decal, printed logo or other graphical content on that portion of the golf club holder. In such embodiments, the head-engaging portion may optionally include a recessed portion for receiving a decal.

Referring to FIGS. 11-20, a second embodiment of a golf club holder 110 is substantially identical to the first embodiment, apart from the head-engaging portion 116. In this second embodiment of a golf club holder 110, the blade 130 does not extend substantially wider than the middle portion 18 of the body 112. This embodiment lacks the wider blade 30 of the first embodiment of a golf club holder 10, which better restricts the golf club from rotating and has a correspondingly smaller head-engaging surface 134. However, the upper stop 26 which extends to the centerline 38 is able to accommodate a slight amount of rotation in the club without the club head rotating out from under the upper stop 26. This second embodiment of the gold club holder 110 has a narrower profile than the first embodiment of a golf club holder 10 and is optimized for storage and transportation in long, narrow containers, such as tube-shaped pockets or holders.

Referring to FIGS. 21-30, a third embodiment of a golf club holder 210 is substantially identical to the first embodiment of a golf club holder 10, apart from the head-engaging portion 216. In the third embodiment, the golf club holder 210 includes at least one cavity 248 in the blade 230. In the depicted embodiment, the golf club holder 210 includes an array of six cavities 248 in the blade 230. The cavities 248 reduce the amount of material used in the manufacture of the golf club holder 210, thereby reducing its weight.

In this third embodiment, the upper stop 226 is offset from the centerline 38 of the golf club holder 210. The upper stop 226 extends from the right side 236 of the golf club holder 210 in the direction of the centerline 38, but does not reach the centerline 38. In some embodiments, the upper stop 226 extends from the right side 236 of the golf club holder 210 to a position 3/16" from of the centerline 38. When the golf club holder 210 is mounted on a straight shaft golf club, the club shaft extends along the centerline 38 through the shaft-engaging portion 14 and middle portion 18 and terminates with the club head positioned within the head-engaging portion 216. Offsetting the upper stop 226 from the centerline 38 allows the golf club holder 210 to receive a straight shaft golf club. A golf club holder 210 with an offset upper stop 226 would also be capable of receiving an offset putter.

In some embodiments, the golf club holder 10, 110, 210 optionally includes a spacer (not shown). The spacer may be a foam or plastic piece confirming to the shape of the blade 30, 130, 230. The spacer may be attached to the blade 30, 130, 230 such that the spacer fits between the blade and the club head. When mated with the disclosed third embodiment of the golf club holder 210 or other embodiments of the golf club holder with cavities 248 in the blade 230, the spacer may include protrusions shaped to engage the cavities 248. In other embodiments, the surface of the spacer configured to contact the blade is substantially flat. The spacer may be attached to the blade via an adhesive, mechanical engagement with cavities, or other means or combination of means of attachment known in the art.

Inclusion of the spacer allows the golf club holder 10, 110, 210 to be customized to receive club heads of different widths or club of different offsets. A golf club may have a zero offset (i.e., a straight shaft), a half offset, or a full offset. When a half offset or full offset putter is mounted on a golf club holder configured to hold the head of a straight shaft golf club flush adjacent to the blade, the head of the putter will be spaced apart from the blade. A space between the club head and blade may also form when the golf club holder is mounted on a straight shaft putter with a comparatively narrow head. This spacing may allow the club head to rotate before contacting the rotation-restricting blade 30, 130, 230, possibly allowing the head to lose contact with the upper stop 26, 126, 226 or lower stop 28, 128, 228. Providing a spacer between the blade 30, 130, 230 and the club head inhibits such rotation.

Referring to FIGS. 31-38, the first embodiment of the golf club holder 10 is displayed as mounted on an offset putter 50. The offset putter 50 includes a substantially straight shaft 52, a grip 54 attached at one end of the shaft 52, a bent hosel 56 attached at the opposite end of the shaft 52, and a head 58 attached to the hosel 56. As most easily seen in FIGS. 33 and 34, the bend 60 in the hosel 56 positions the head 58 at an angle such that the head 58 is not perpendicular to the shaft 52. The head 58 includes a club face 64 for contacting the golf ball, a rear face 66 opposite the club face, a heel 68 whereat the shaft 52 is connect to the head 58, a toe 70 opposite the heel 68, a crown 72 and a sole 62 opposite the crown 72. When a golfer addresses a ball and prepares to strike it with the offset putter 50, the heel 68 is the end of the head 58 closest to the golfer's feet. The head 58 extends away from the golfer, with the toe 70 being the end furthest from the golfer's feet. The club face 64 is orientated in the direction of the ball and the rear face 66 is oriented opposite the direction of the ball. In this orientation, the crown 72 is the top of the head 58 and the sole 62 is the bottom of the head 58.

When the offset putter 50 is mounted on the first embodiment of the golf club holder 10, the shaft 52 extends through the shaft-engaging portion 14 and into the middle portion 18. The hosel 56 attached at the end of the shaft 52 extends through the opening 24 to exit the middle portion 18. The head 58 is received by the head-engaging portion 16, the crown 72 of the head 58 fitting below the upper stop 26, the sole 62 of the head 58 fitting above the lower stop 28, and the club face 64 adjacent to the blade 30. The head 58 of a putter 50 or other golf club is typically angled with respect to the shaft 52, such that the sole 62 (i.e., the bottom of the head of the club) is not perpendicular to the elongated shaft 52. Likewise, the blade 30 and upper and lower stops 26, 28 are correspondingly angled with respect to the centerline 38 of the golf club holder 10.

In practice, a user may mount a putter 50 onto the golf club holder 10 by placing the head 58 within the head-engaging portion 16 then mechanically interlocking the shaft 52 into the shaft-engaging portion 14. The user may remove the putter 50 from the golf club holder 10 by performing the process in reverse. When the putter 50 is mounted on the golf club holder 10, the user may hold the grip 54 and press the putter 50 downwards, pressing the sole 62 of the head 58 against the lower stop 28, thereby driving the ground-engaging base 20 of the golf club holder 10 into the ground. The golf club holder 10 will then maintain a substantially vertical orientation while the user releases the grip 54 and performs other activities. When the user has need of the putter 50, the user may grasp the putter 50 by the grip 54 and pull upwards, pressing the crown 72 of the head 58 against the upper stop 26, thereby pulling the ground-engaging base 20 upward and out of the ground. When pushing the club 50 downwards or pulling the club 50 upwards by the grip 54, the angle between the head 58 and shaft 52 tends to cause the head 58 to rotate with respect to the golf club holder 10. Contact between the club face 64 of the head 58 and the blade 30 (and optionally, a spacer) restricts rotation of the head 58 and inhibits the head 58 from rotating out of contact with the upper stop 26 and lower stop 28. By this process, the user may insert a portion of the golf club holder 10 into the ground, leave the golf club holder 10 and putter 50 in a substantially vertical, grip-up, head-down orientation, and withdraw the golf club holder 10 from the ground while only grasping the grip 54 of the putter 50.

Different offset putter heads may be aligned at different angles and putters may have comparatively larger or smaller heads. To accommodate these differences, the upper stop and lower stop may be sufficiently spaced apart vertically to accommodate putters of substantially all angles and head sizes, sufficiently spaced apart vertically to accommodate a subset of putters, or sufficiently spaced apart to accommodate putters of a specific angle and a specific head size. Contact between the club head and the blade restricts rotation of the head and maintains the head at the correct orientation to engage the upper stop and lower stop. Contact between the head and the upper and lower stops restricts upward and downward movement of the head, maintaining the head within the head-engaging portion.

Figure 13:
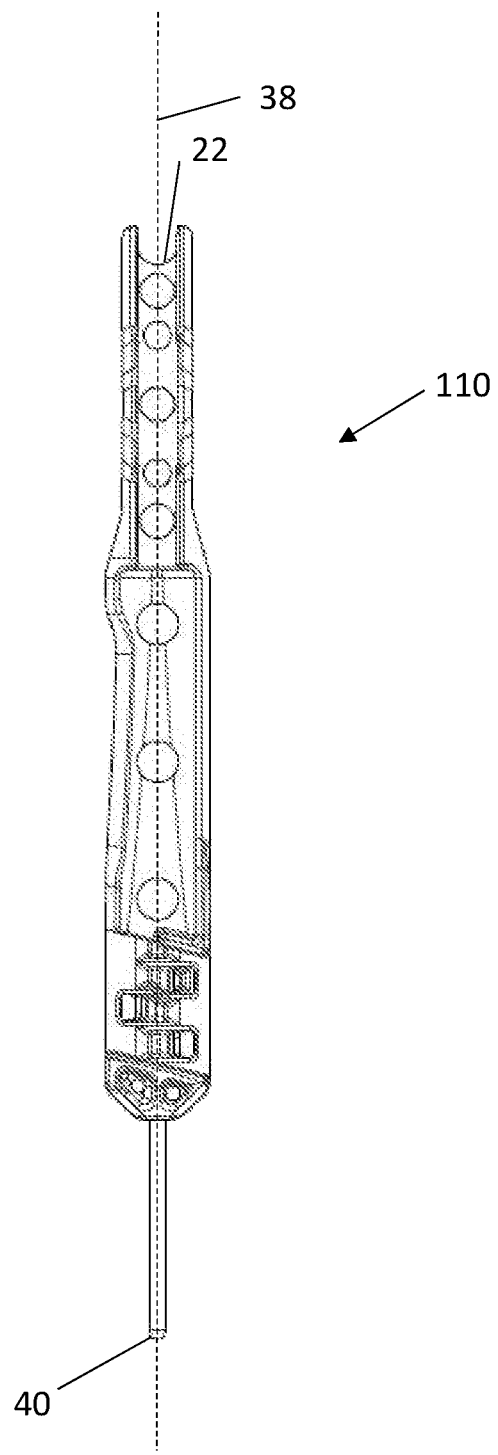
FIG. 13 depicts a front elevation view of the second embodiment of the golf club holder.
Figure 14:
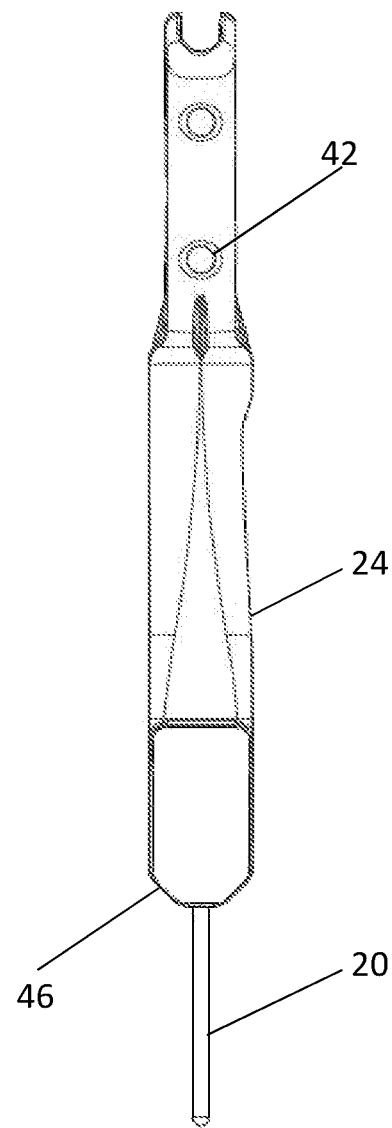
FIG. 14 depicts a rear elevation view of the second embodiment of the golf club holder.
Figure 15:
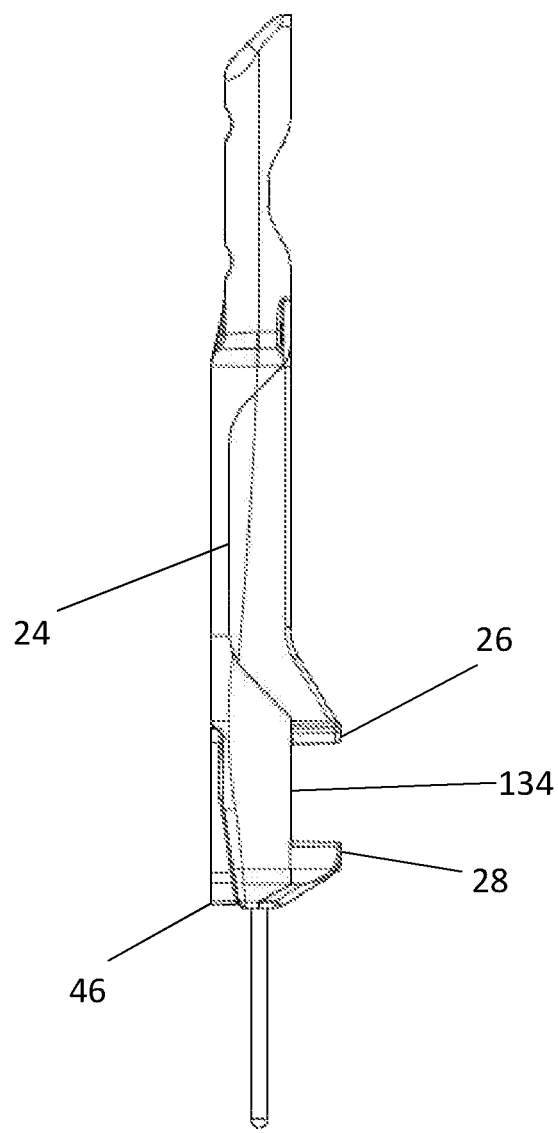
FIG. 15 depicts a right side elevation view of the second embodiment of the golf club holder.
Figure 16:
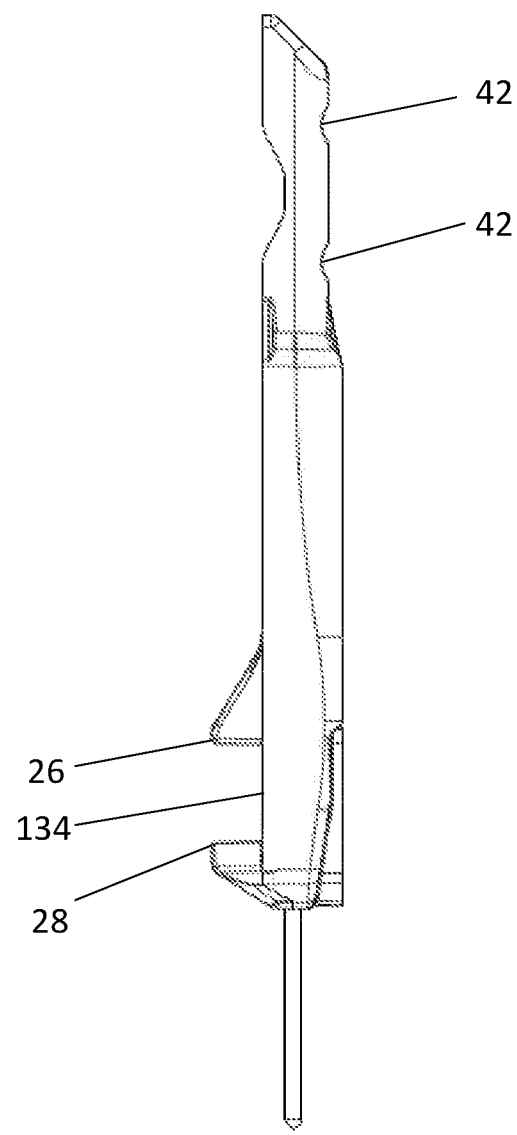
FIG. 16 depicts a left side elevation view of the second embodiment of the golf club holder.
Figure 17:
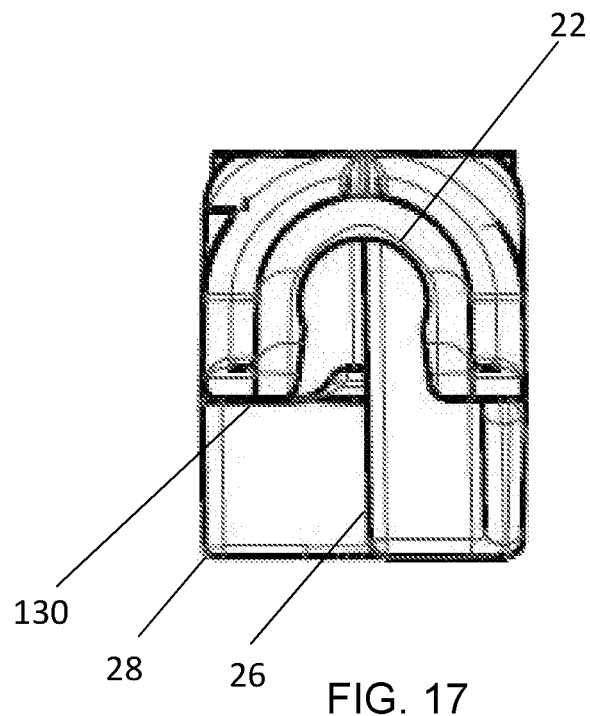
FIG. 17 depicts a top plan view of the second embodiment of the golf club holder.
Figure 18:
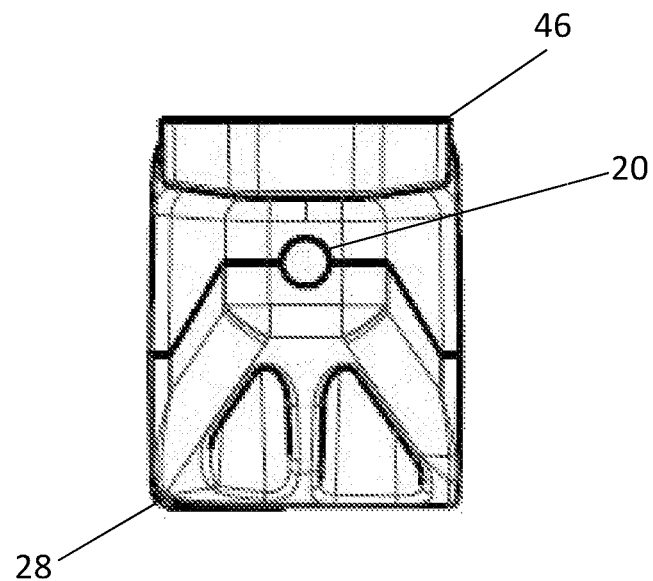
FIG. 18 depicts a bottom plan view of the second embodiment of the golf club holder.
Figure 19:
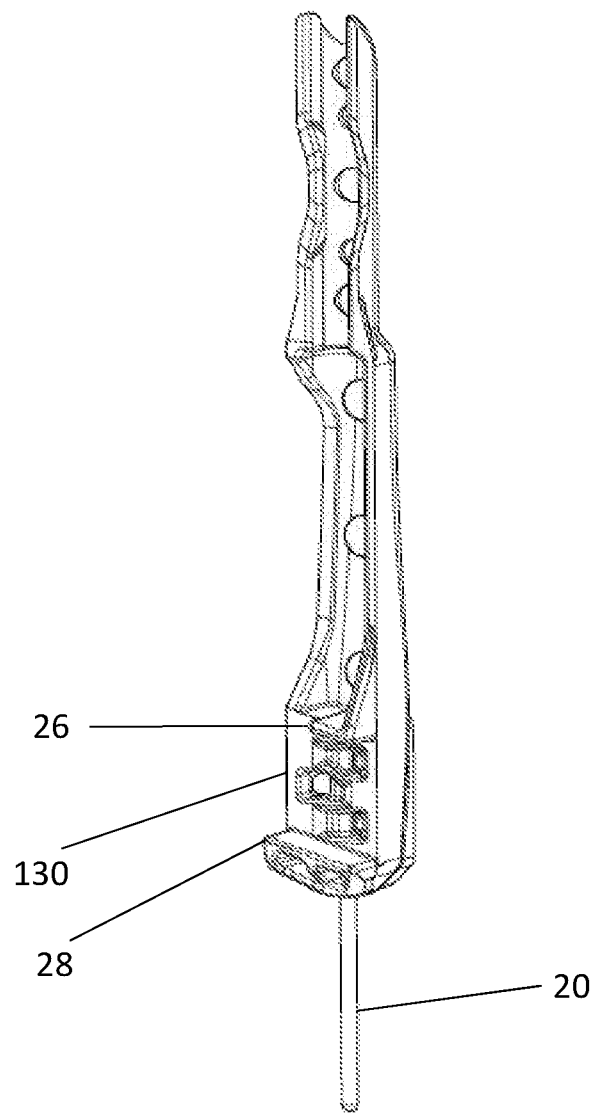
FIG. 19 depicts a front/left side perspective view of the second embodiment of the golf club holder.
Figure 20:
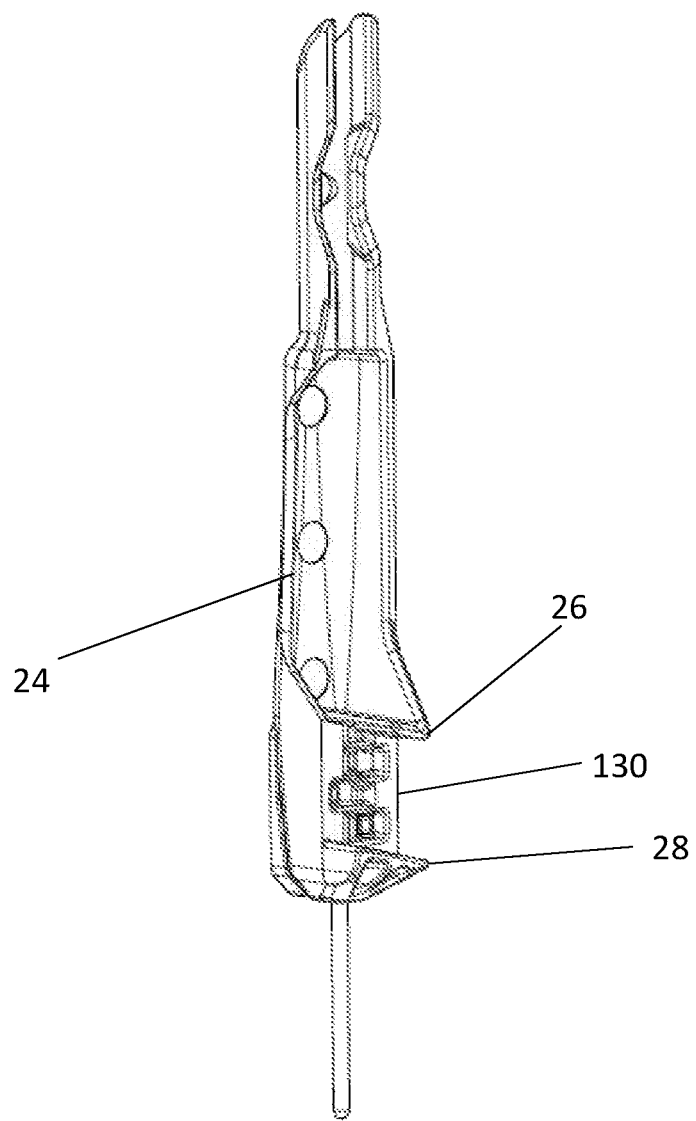
FIG. 20 depicts a front/right side perspective view of the second embodiment of the golf club holder.
Figure 21:
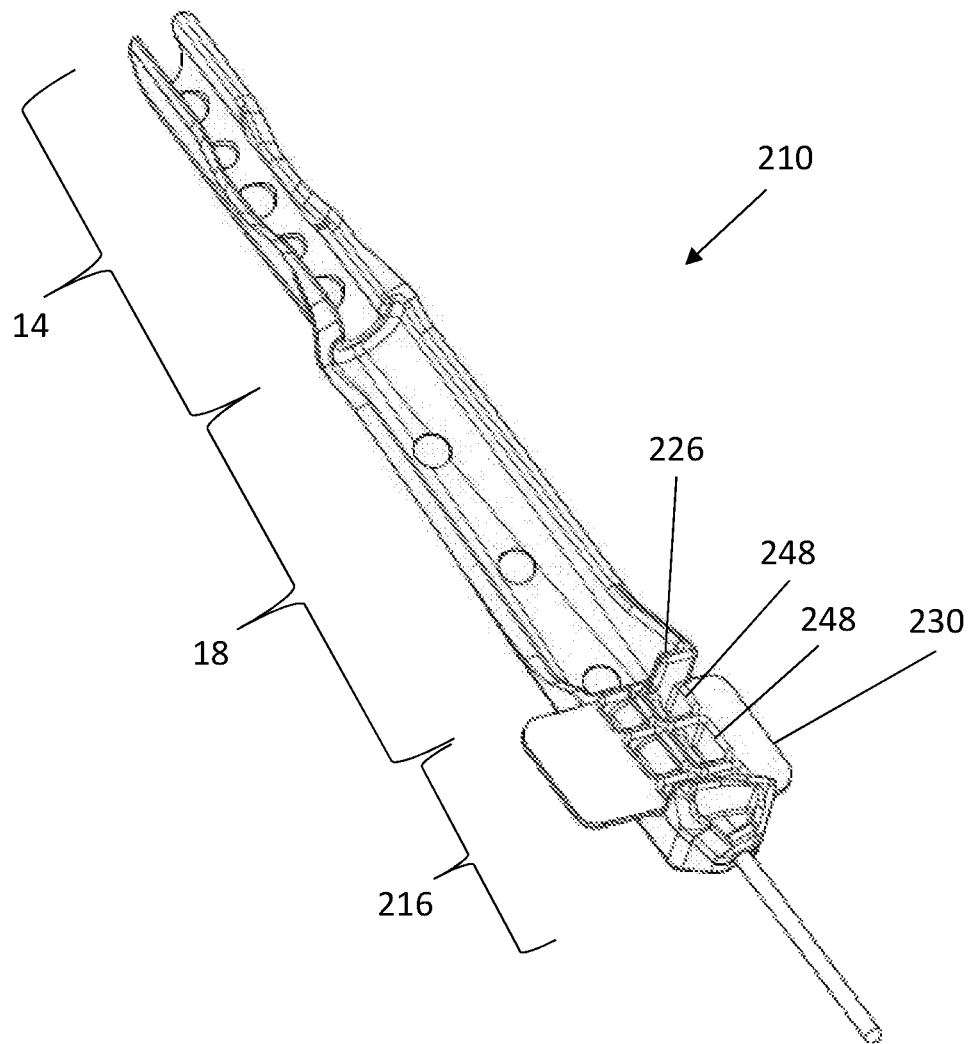
FIG. 21 depicts a front perspective view of a third embodiment of a golf club holder.
Figure 22:
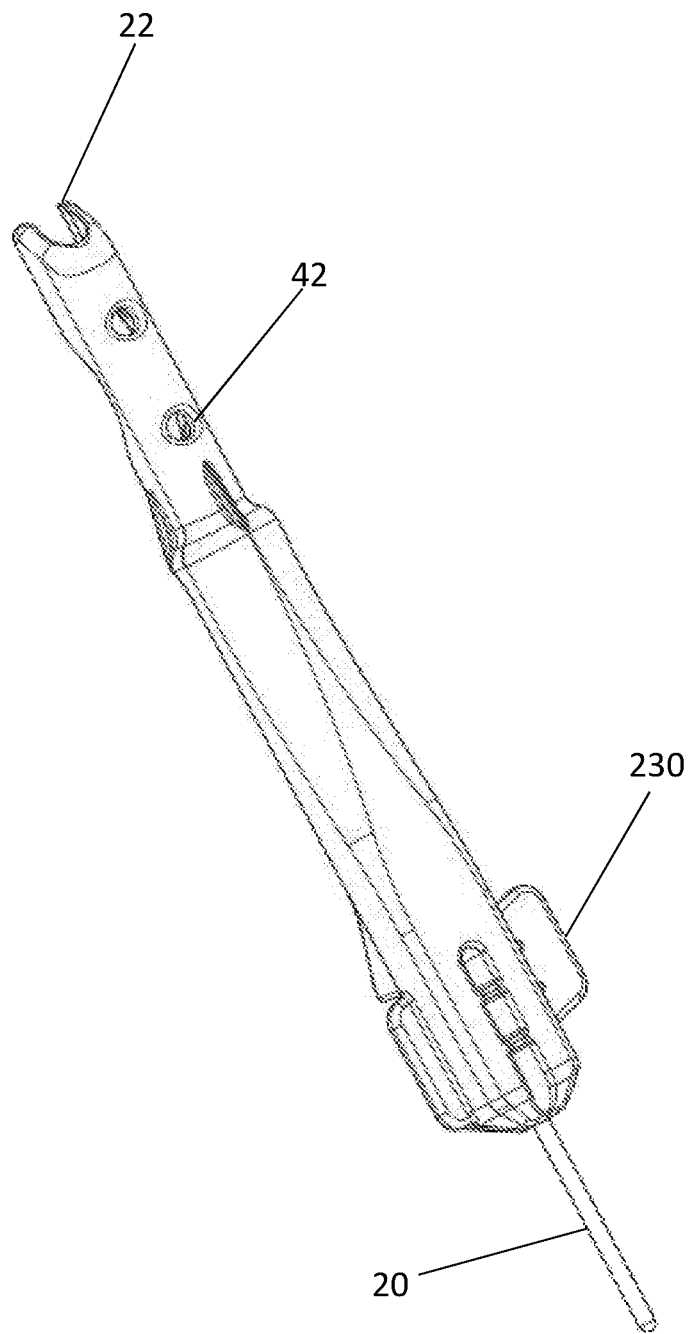
FIG. 22 depicts a rear perspective view of the third embodiment of the golf club holder.
Figure 23:
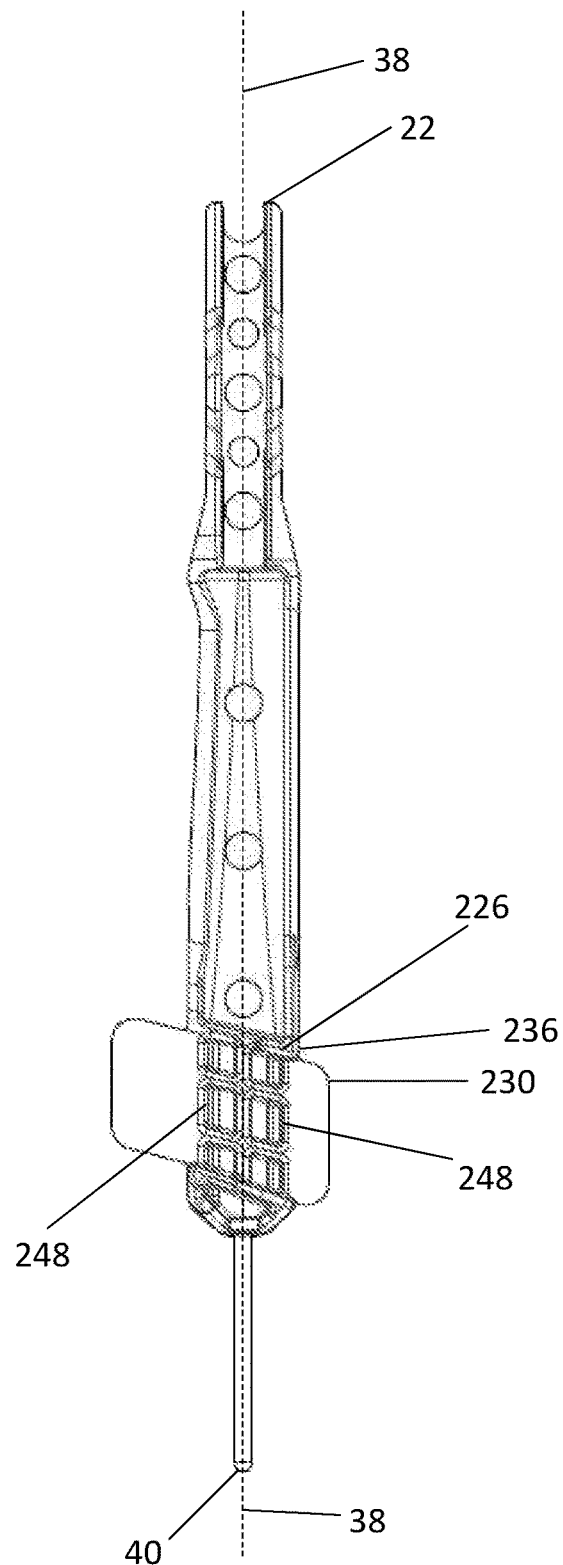
FIG. 23 depicts a front elevation view of the third embodiment of the golf club holder.
Figure 24:
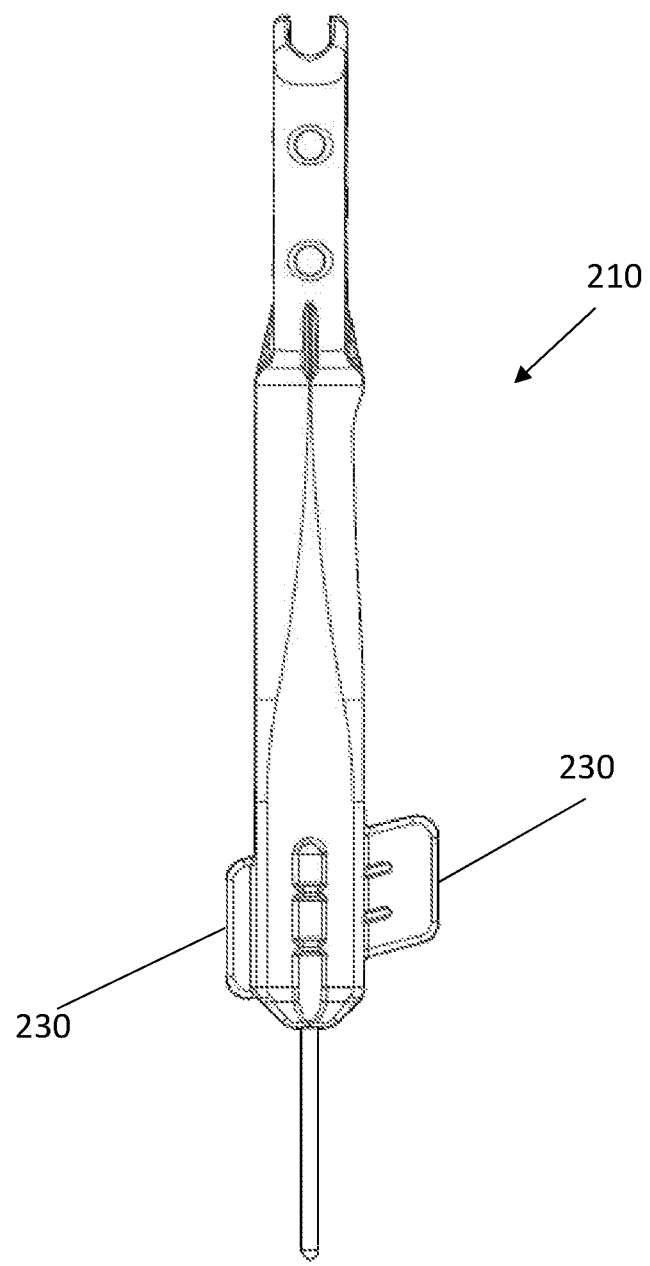
FIG. 24 depicts a rear elevation view of the third embodiment of the golf club holder.
Figure 25:
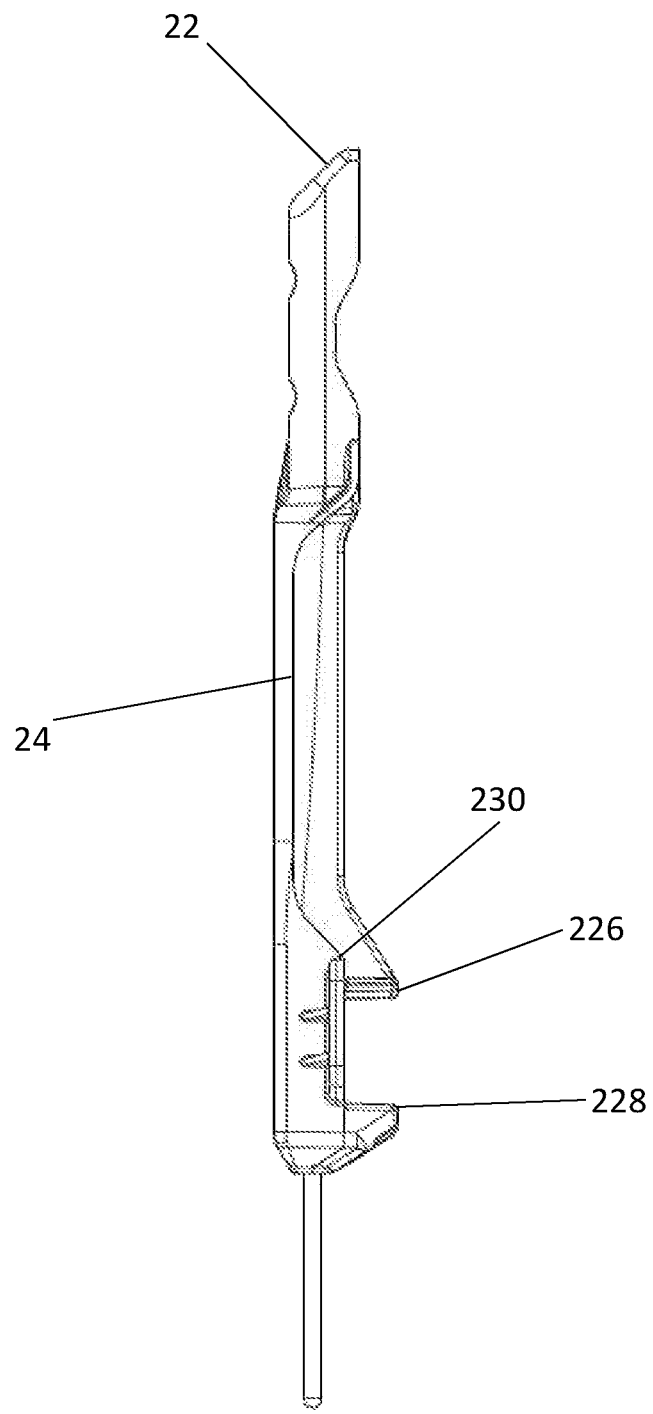
FIG. 25 depicts a right side elevation view of the third embodiment of the golf club holder.
Figure 26:
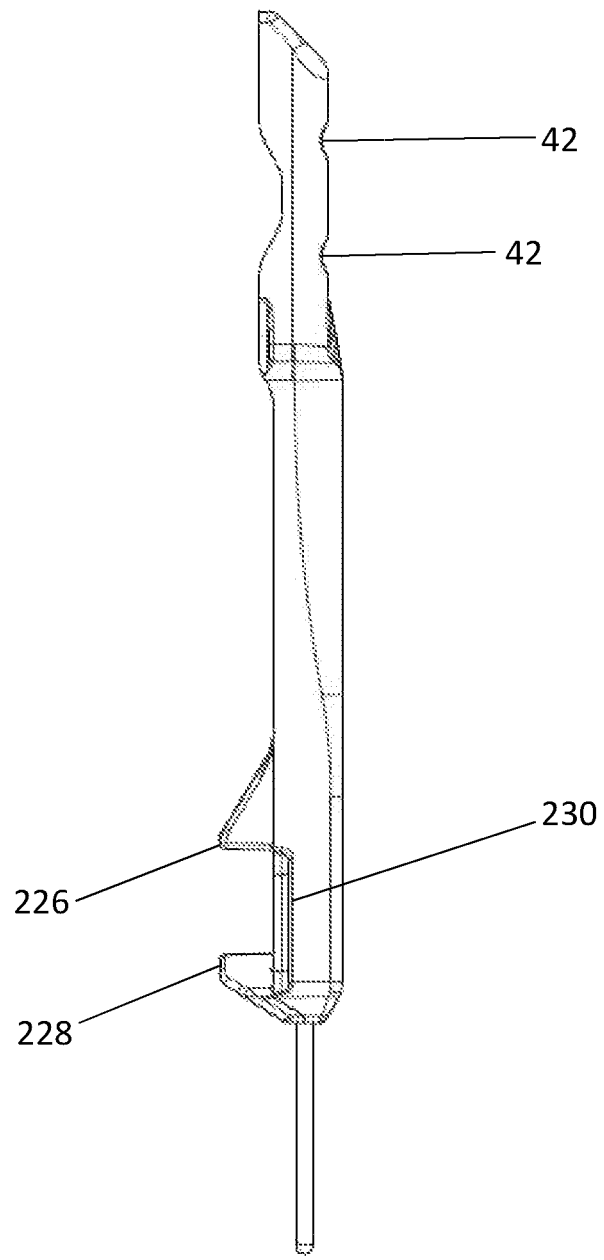
FIG. 26 depicts a left side elevation view of the third embodiment of the golf club holder.
Figure 27:
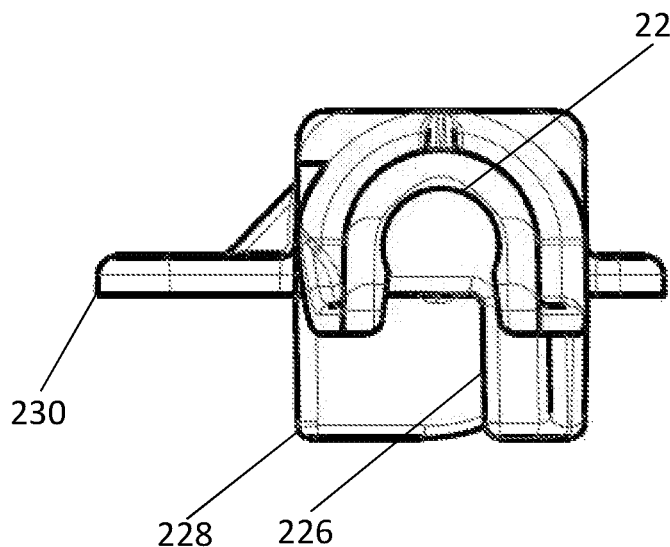
FIG. 27 depicts a top plan view of the third embodiment of the golf club holder.
Figure 28:
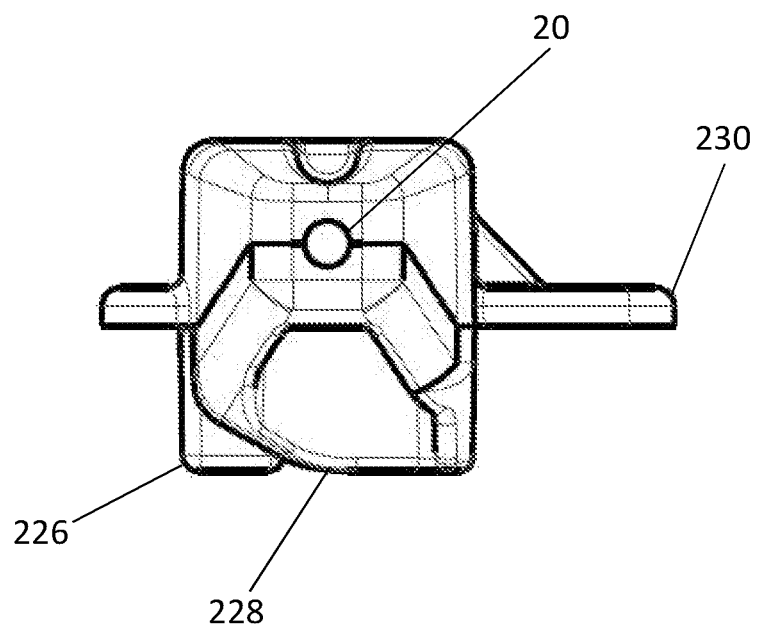
FIG. 28 depicts a bottom plan view of the third embodiment of the golf club holder.
Figure 29:
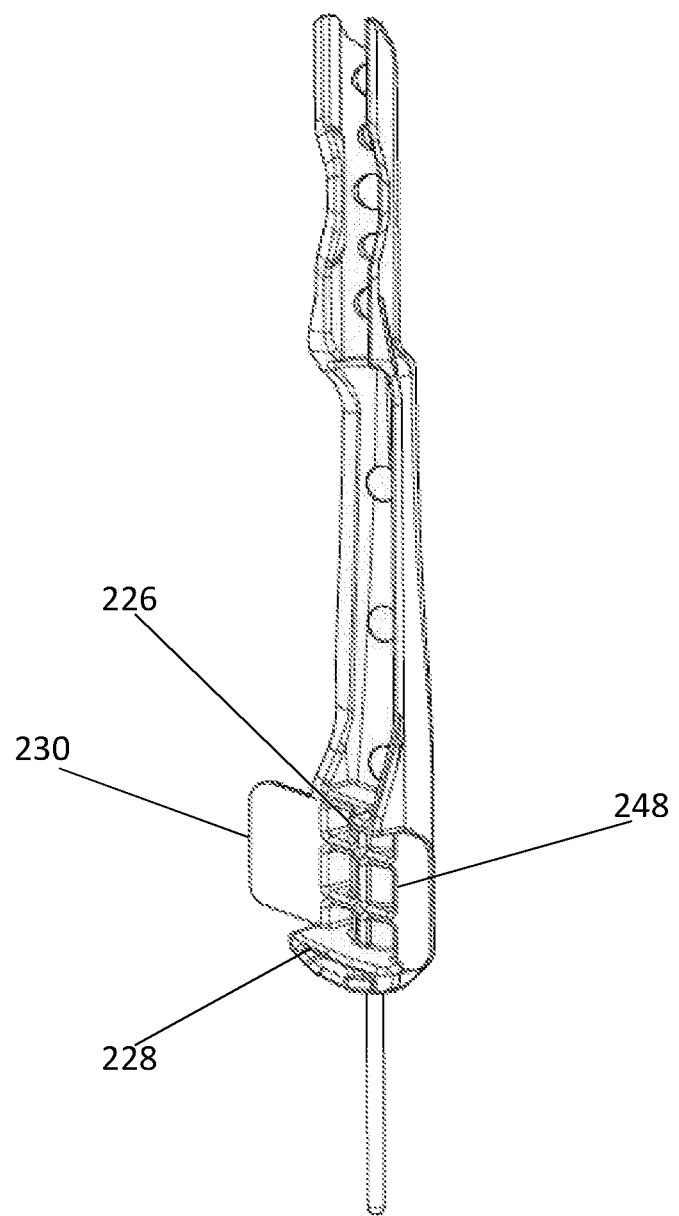
FIG. 29 depicts a front/left side perspective view of the third embodiment of the golf club holder.
Figure 30:
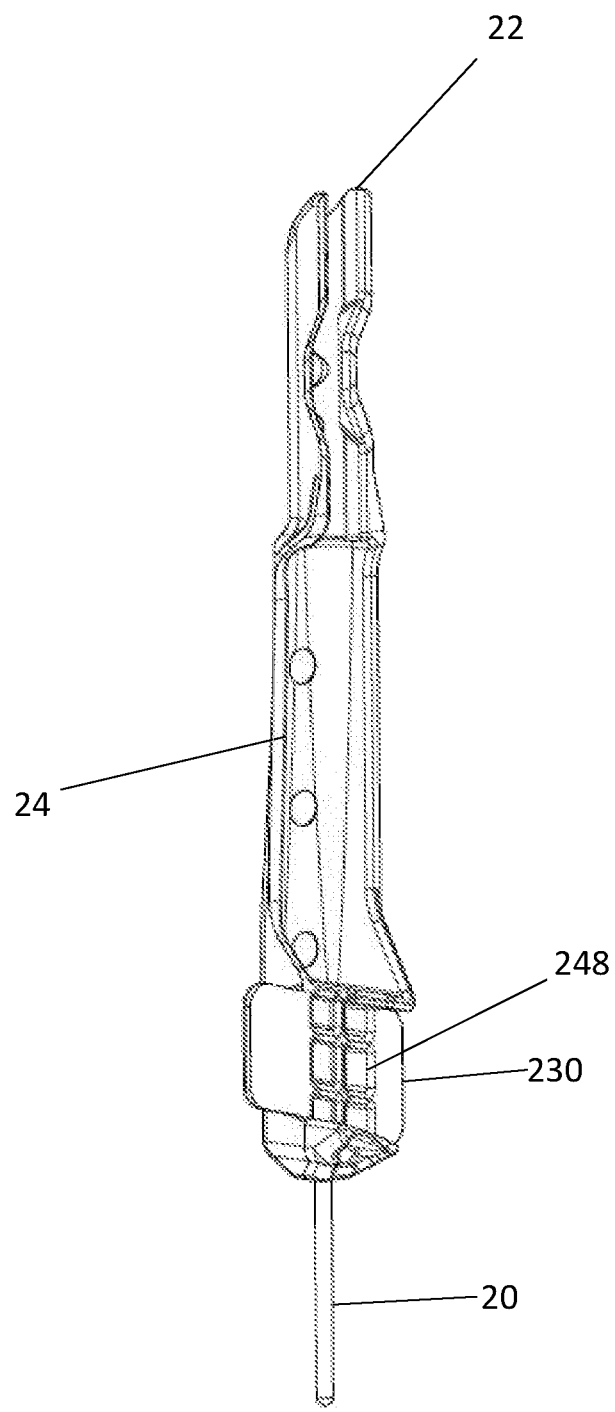
FIG. 30 depicts a front/right side perspective view of the third embodiment of the golf club holder.
Figure 31:
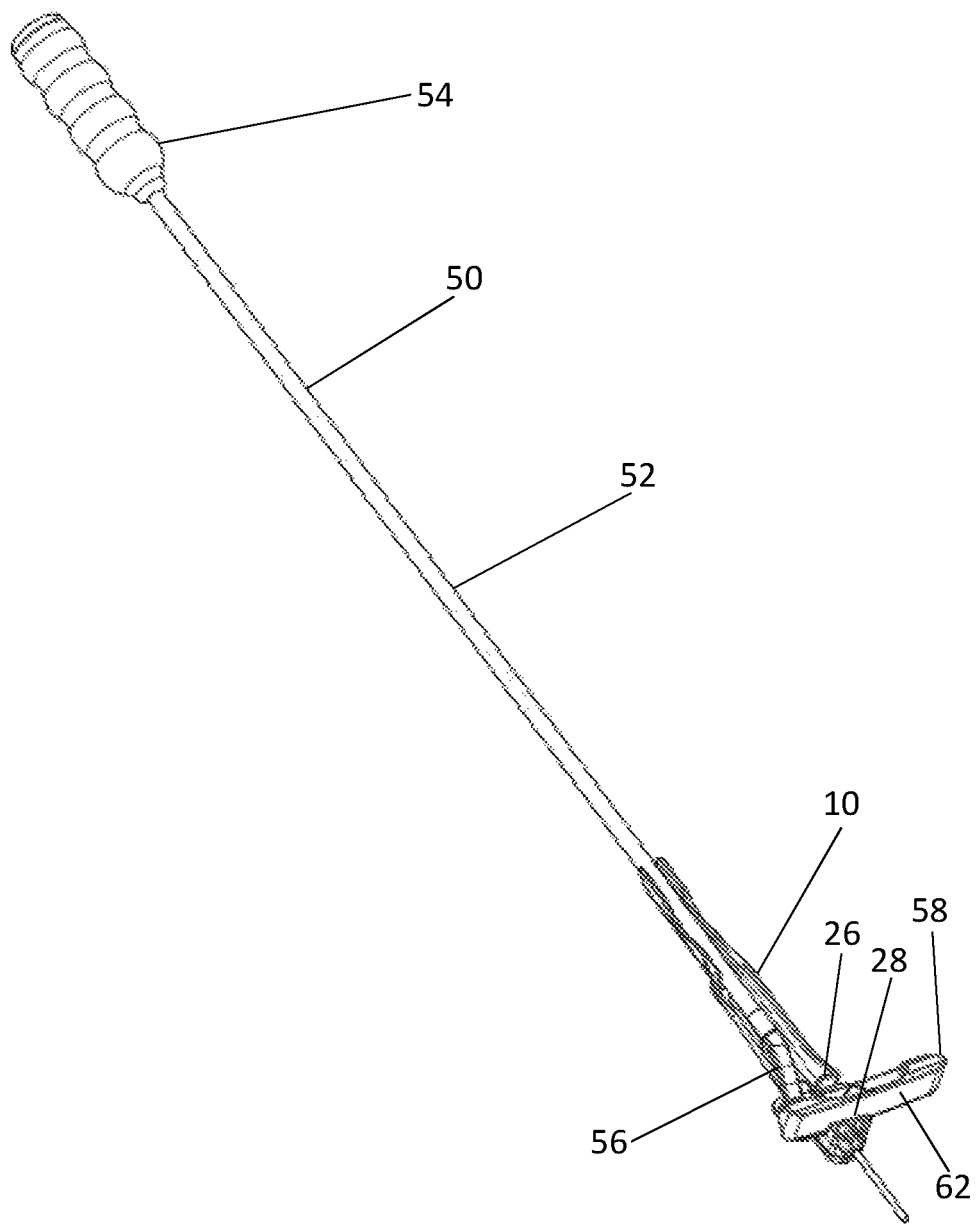
FIG. 31 depicts a front perspective view of the first embodiment of the golf club holder mounted on an offset putter.
Figure 32:
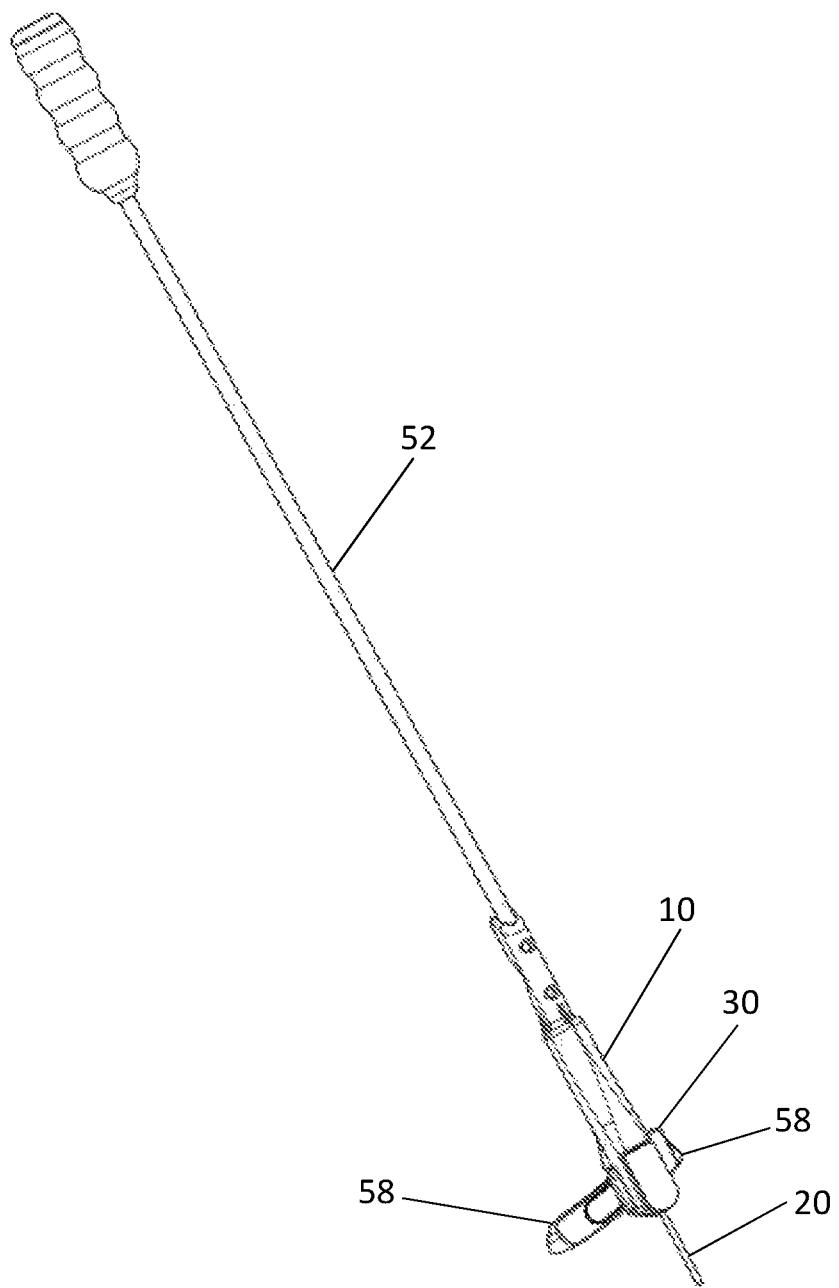
FIG. 32 depicts a rear perspective view of the first embodiment of the golf club holder mounted on an offset putter.
Figure 33:
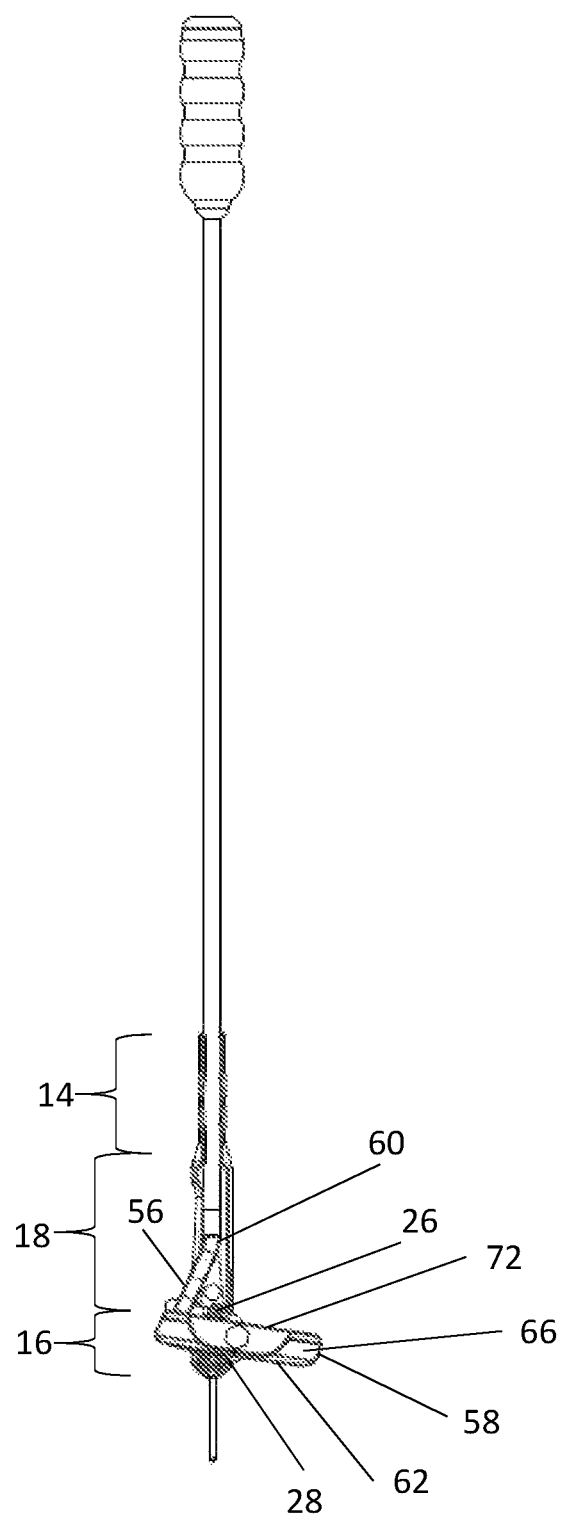
FIG. 33 depicts a front elevation view of the first embodiment of the golf club holder mounted on an offset putter.
Figure 34:
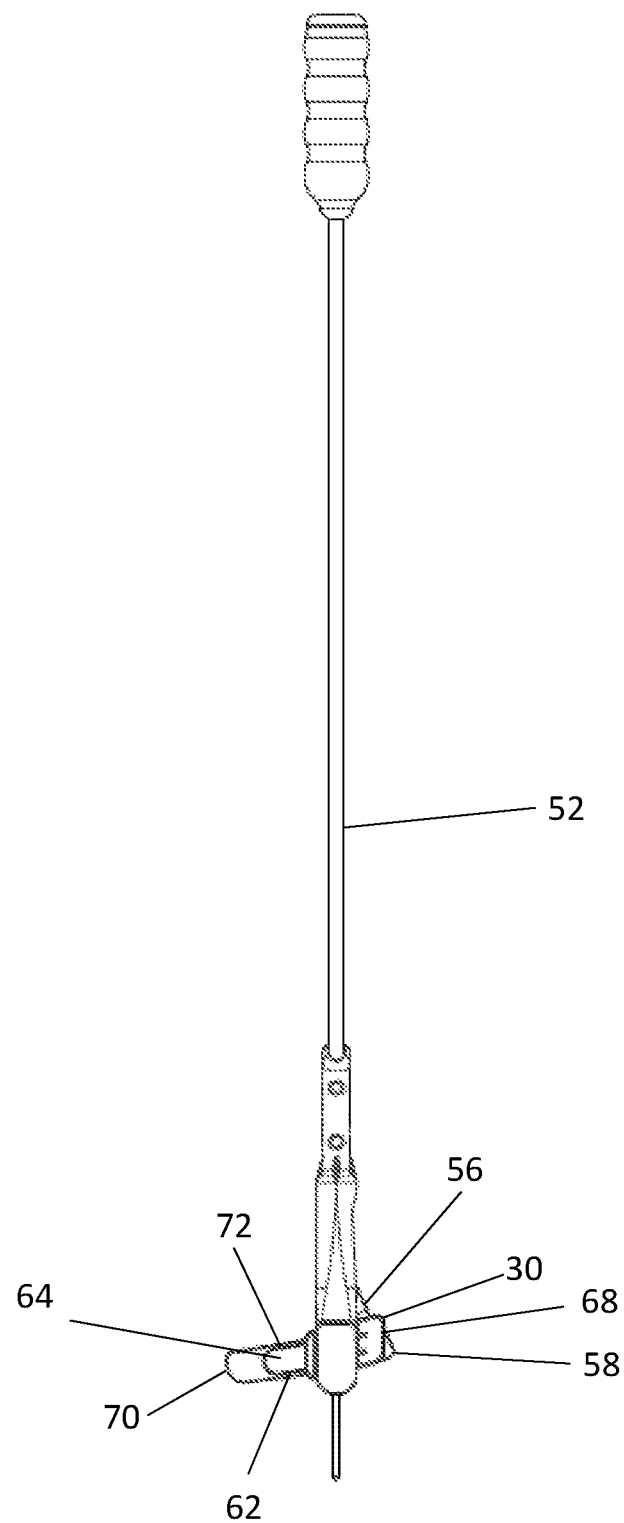
FIG. 34 depicts a rear elevation view of the first embodiment of the golf club holder mounted on an offset putter.
Figure 35:
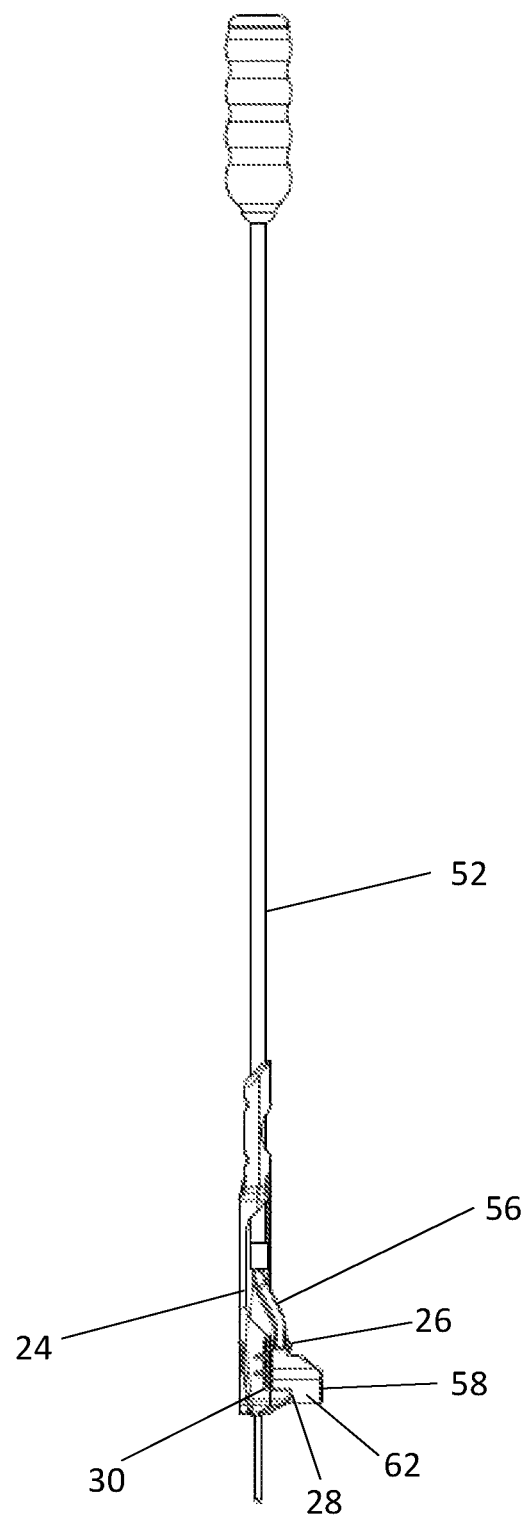
FIG. 35 depicts a right elevation view of the first embodiment of the golf club holder mounted on an offset putter.
Figure 36:
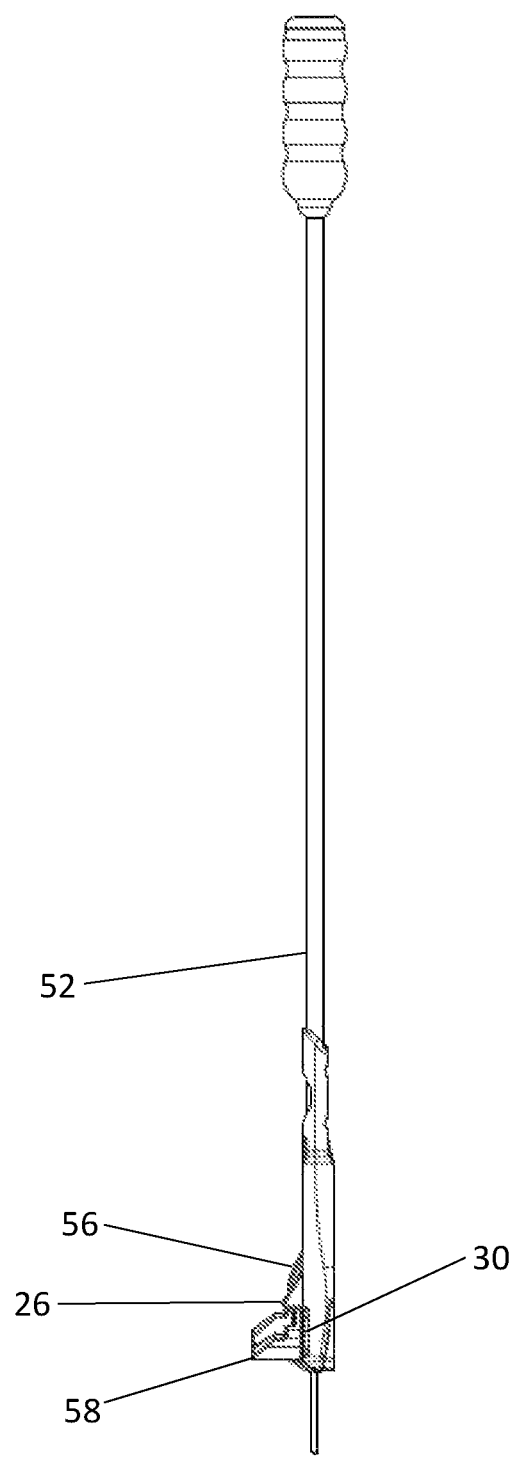
FIG. 36 depicts a left elevation view of the first embodiment of the golf club holder mounted on an offset putter.
Figure 37:
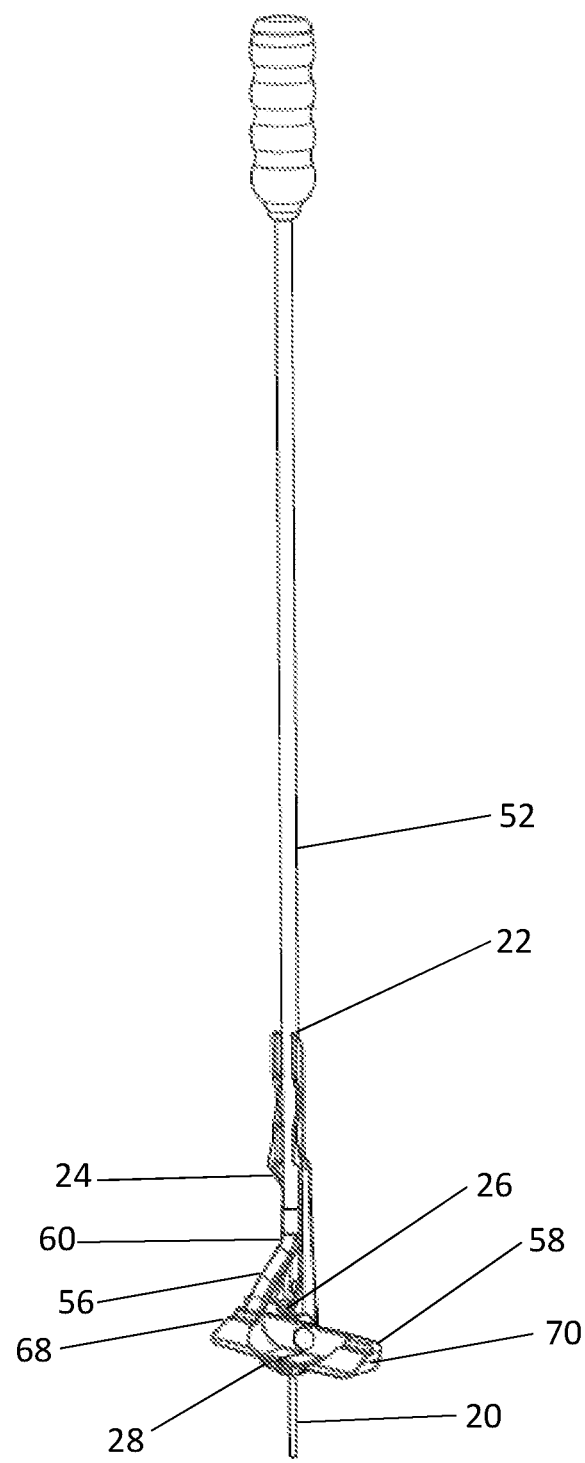
FIG. 37 depicts a front/left side elevation view of the first embodiment of the golf club holder mounted on an offset putter.
Figure 38:
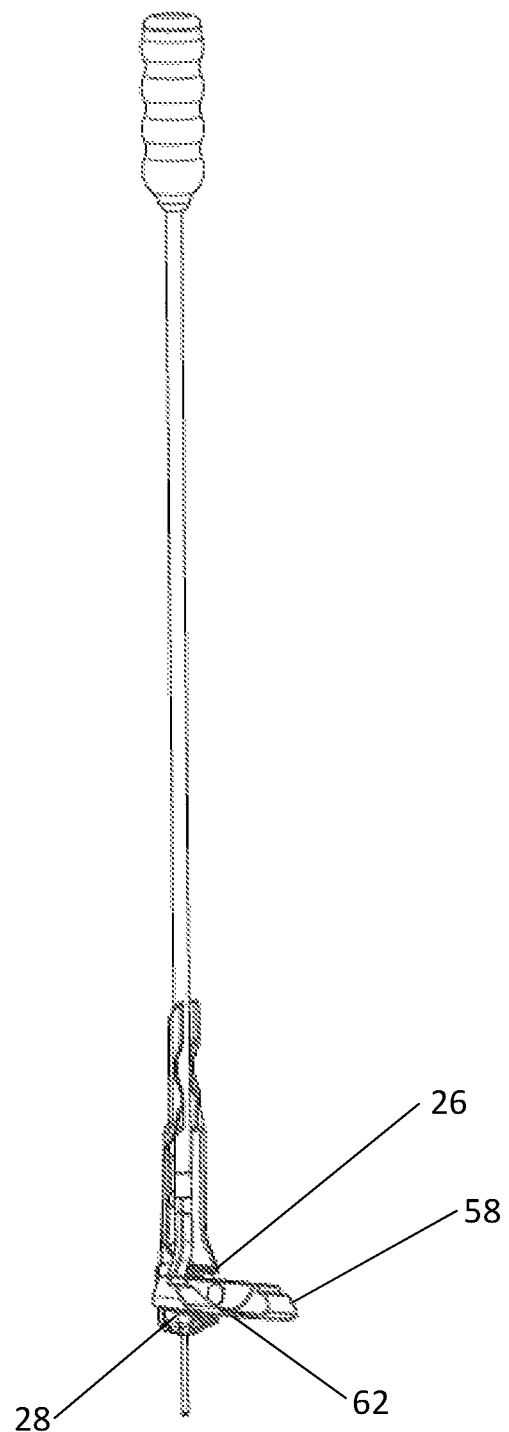
FIG. 38 depicts a front/right side elevation view of the first embodiment of the golf club holder mounted on an offset putter.

In the depicted first, second and third embodiments, the upper and lower stops 26, 126, 226, 28, 128, 228 are substantially flat protrusions extending substantially perpendicular to the blade 30, 130, 230, as best seen in FIGS. 7, 17 and 27, and angled with respect to the centerline 38, as best seen in FIGS. 3, 13 and 23. In some embodiments, the blade, upper stop, and lower stop are angled about 0 degrees to about 30 degrees from perpendicular to the centerline. In other embodiments, the blade, upper stop, and lower stop are angled about 10 degrees to about 25 degrees from perpendicular to the centerline. In further embodiments, the blade, upper stop, and lower stop are angled about 15 degrees to about 20 degrees from perpendicular to the centerline. In the depicted embodiments, the upper stop 26, 126 and 226 and blade 30, 130 and 230 are angled about 15 degrees from perpendicular to the centerline 38 and the lower stop 28, 128 and 228 is angled 20 degrees from perpendicular to the centerline 38. In other embodiments (not shown), the upper and lower stops may be cylindrical pegs or pins extending substantially perpendicular to the blade.

Current USGA rules allow a bend in the shaft of a golf club only at a point not more than 5 inches above the sole of the club. In preferred embodiments, the vertical distance between the lower stop (which may contact the sole) and the transition between the shaft-engaging portion and the middle portion is at least five inches to accommodate putters with bends at the highest allowable point on the shaft. Those skilled in the art will understand that the dimensions of the golf club holder may change as USGA rules evolve.

In some embodiments, the body of the golf club holder is formed of a lightweight, resilient material, such as plastic. In certain embodiments, a portion of the body or the entirety of the body may be formed using injection molding techniques, as are generally known in the art. In some embodiments, the body is formed of plastic and the ground-engaging base is a metal spike affixed to the body. In certain embodiments, the body is substantially rigid. In other embodiments, the body is formed of a resilient, but slightly deformable material, such as polypropylene. In such embodiments, the body is preferably sufficiently deformable that an embodiment having an upper stop extending to the centerline may be deformed laterally approximately 3/16" to receive a straight shaft golf club.

In certain embodiments, the upper stop may be omitted from the golf club holder. In such embodiments, engagement between the shaft-engaging portion and the shaft of the golf club is relied upon to withdraw the golf club holder from the ground when the golfer pulls the club upwards.

The foregoing detailed description describes the golf club holder primarily in terms of a holder configured for an offset putter. However, this description is not intended to be limiting and the disclosed golf club holder may be used with any golf club capable of being supported thereby.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only.

What is claimed is:

1. A golf club holder for supporting a golf club in a substantially vertical orientation, the golf club having a head for impacting a golf ball, an elongated shaft connected at one end to the head, and a grip attached to the other end of the shaft, wherein the head includes a club face for contacting the golf ball, a rear face opposite the club face, a heel whereat the shaft is connect to the head, a toe opposite the heel, a crown and a sole opposite the crown, the golf club holder comprising:
    a body including
    a shaft-engaging portion configured to mechanically engage the shaft,
    a non-rotatable head-engaging portion including a lower stop and an upper stop spaced apart to receive the crown and the sole of the head between the lower stop and the upper stop, and a middle portion between the shaft-engaging portion and the head-engaging portion, wherein the middle portion includes an opening sized to receive one of the shaft and a hosel positioned between the shaft and the head.

2. The golf club holder of claim 1, further comprising a ground-engaging base extending from the body.

3. The golf club holder of claim 2, wherein the ground-engaging base is a spike extending from the head-engaging portion.

4. The golf club holder of claim 1, wherein the shaft-engaging portion is shaped to mechanically engage the shaft via a snap-fit engagement.

5. The golf club holder of claim 1, wherein the head-engaging portion includes a blade, wherein the lower stop and the upper stop extend from the head-engaging portion in a direction substantially perpendicular to the blade.

6. The golf club holder of claim 5, wherein the blade has a width substantially equal to a width of the body.

7. The golf club holder of claim 5, wherein the blade has a width greater than a width of the body.

8. The golf club holder of claim 7, wherein the width of the blade, measured from a centerline of the golf club holder, is asymmetrical.

9. The golf club holder of claim 5, further comprising at least one cavity in the blade.

10. The golf club holder of claim 1, wherein the upper stop and lower stop are angled between 0 degrees and 30 degrees from perpendicular to a centerline of the golf club holder.

11. The golf club holder of claim 10, wherein the upper stop and lower stop are angled between 10 degrees and 25 degrees from perpendicular to the centerline.

\* \* \* \* \*